US012789609B2

(12) United States Patent
Hanai et al.

(10) Patent No.: US 12,789,609 B2
(45) Date of Patent: Nov. 10, 2026

(54) VEHICLE THAT INCLUDES A FOUR-WHEEL DRIVE UNIT AT A LOWER COST

(71) Applicant: AISIN CORPORATION, Kariya (JP)

(72) Inventors: Takayoshi Hanai, Kariya (JP); Nozomu Takahashi, Kariya (JP)

(73) Assignee: AISIN CORPORATION, Kariya (JP)

( * ) Notice: Subject to any disclaimer, the term of this patent is extended or adjusted under 35 U.S.C. 154(b) by 208 days.

(21) Appl. No.: 18/694,222

(22) PCT Filed: Sep. 27, 2022

(86) PCT No.: PCT/JP2022/035911
§ 371 (c)(1),
(2) Date: Mar. 21, 2024

(87) PCT Pub. No.: WO2023/054348
PCT Pub. Date: Apr. 6, 2023

(65) Prior Publication Data

US 2025/0042233 A1 Feb. 6, 2025

(30) Foreign Application Priority Data

Sep. 28, 2021 (JP) ................................ 2021-158215

(51) Int. Cl.
*B60K 1/02* (2006.01)
*B60K 17/354* (2006.01)
*B60K 17/356* (2006.01)

(52) U.S. Cl.
CPC .............. *B60K 1/02* (2013.01); *B60K 17/354* (2013.01); *B60K 17/356* (2013.01)

(58) Field of Classification Search
CPC ...... B60K 1/02; B60K 17/354; B60K 17/356; F16H 48/42; F16H 57/0424
See application file for complete search history.

(56) References Cited

U.S. PATENT DOCUMENTS 11,021,055 B2 6/2021 Crotti et al.
2009/0111641 A1* 4/2009 Kim .................... B60K 17/043 477/5

(Continued)

FOREIGN PATENT DOCUMENTS

| | | |
|---|---|---|
| EP | 3 534 042 A1 | 9/2019 |
| EP | 3597464 A1 | 1/2020 |
| JP | 2015-061414 A | 3/2015 |

OTHER PUBLICATIONS

Dec. 6, 2022 International Search Report issued in International Patent Application No. PCT/JP2022/035911.

(Continued)

*Primary Examiner* — Edwin A Young
(74) *Attorney, Agent, or Firm* — Oliff PLC

(57) ABSTRACT

A front-wheel drive unit includes a first rotor on a first axis and a first differential input gear on a second axis located in a rear direction from the first axis along an axis in a front-rear direction. A rear-wheel drive unit includes a second rotor on a third axis and a second differential input gear on a fourth axis located in a front direction from the third axis along the axis in the front-rear direction. The first rotor is in a first width direction from a first transmission gear assembly. The second rotor is in a second width direction from a second transmission gear assembly. A wheelbase between the first axis and the second axis is equal to a wheelbase between the third axis and the fourth axis. The first rotor and the second rotor rotate in reverse directions while a vehicle is traveling.

16 Claims, 11 Drawing Sheets

(56) References Cited

U.S. PATENT DOCUMENTS

| | | | | |
|---|---|---|---|---|
| 2012/0286607 | A1* | 11/2012 | Shimizu | F16H 57/0471 310/90 |
| 2016/0229293 | A1 | 8/2016 | Seo et al. | |
| 2016/0375756 | A1* | 12/2016 | Choi | B60K 6/52 475/5 |
| 2018/0076687 | A1 | 3/2018 | Pritchard et al. | |
| 2019/0249765 | A1 | 8/2019 | Ito et al. | |
| 2020/0023734 | A1 | 1/2020 | Crotti et al. | |
| 2020/0094684 | A1* | 3/2020 | Uddin | F16H 48/08 |
| 2020/0271194 | A1 | 8/2020 | Takahashi et al. | |
| 2021/0252977 | A1 | 8/2021 | Engerman | |

OTHER PUBLICATIONS

Oct. 25, 2024 Extended Search Report issued in European Patent Application No. 22876214.2.

Aug. 6, 2026 Office Action issued in Indian Patent Application No. 202417021170.

* cited by examiner

VEHICLE THAT INCLUDES A FOUR-WHEEL DRIVE UNIT AT A LOWER COST

FIELD

The present disclosure relates to a vehicle including a front-wheel drive unit that drives a pair of front wheels, and a rear-wheel drive unit that drives a pair of rear wheels.

BACKGROUND

Japanese Unexamined Patent Application Publication No. 2015-61414 describes an electric vehicle including a front-wheel drive unit and a rear-wheel drive unit. The electric vehicle drives in a two-wheel drive mode with the front-wheel drive unit during normal driving, and can drive in a four-wheel drive mode with also a driving force from the rear-wheel drive unit under specific conditions such as snow-covered roads. The front-wheel and rear-wheel drive units in the electric vehicle differ in, for example, the specifications of a rotary electric machine, the structure of a transmission such as gears, and the positional arrangement of axes.

CITATION LIST

Patent Literature

Patent Literature 1: Japanese Unexamined Patent Application Publication No. 2015-61414

BRIEF SUMMARY

Technical Problem

As described above, in the above electric vehicle, the front-wheel drive unit and the rear-wheel drive unit have different structures, and thus are to be designed and manufactured separately. This increases the cost for development and manufacture of a four-wheel drive vehicle.

In response to the above, techniques are awaited for a vehicle including a four-wheel drive unit at a lower cost.

Solution to Problem

In response to the above, a vehicle includes a front-wheel drive unit that drives a pair of front wheels and a rear-wheel drive unit that drives a pair of rear wheels. The front-wheel drive unit includes a first rotary electric machine including a first rotor, a first differential gear assembly that distributes a driving force transmitted to a first differential input gear to the pair of front wheels, a first transmission gear assembly that transmits the driving force between the first rotor and the first differential input gear, and a first case defining a first chamber accommodating the first rotary electric machine, the first differential gear assembly, and the first transmission gear assembly. The first rotor is located on a first axis. The first differential input gear is located on a second axis parallel to and different from the first axis. The rear-wheel drive unit includes a second rotary electric machine including a second rotor, a second differential gear assembly that distributes a driving force transmitted to a second differential input gear to the pair of rear wheels, a second transmission gear assembly that transmits the driving force between the second rotor and the second differential input gear, and a second case defining a second chamber accommodating the second rotary electric machine, the second differential gear assembly, and the second transmission gear assembly. The second rotor is located on a third axis. The second differential input gear is located on a fourth axis parallel to and different from the third axis. The front-wheel drive unit has the first axis in a front direction from the second axis and the first rotor in a first width direction from the first transmission gear assembly. The rear-wheel drive unit has the third axis in a rear direction from the fourth axis and the second rotor in a second width direction from the second transmission gear assembly. The front direction is a direction from the pair of rear wheels toward the pair of front wheels along an axis in a front-rear direction. The rear direction is opposite to the front direction. The first width direction is one direction along an axis in a width direction of the vehicle. The second width direction is opposite to the first width direction. A wheelbase between the first axis and the second axis is equal to a wheelbase between the third axis and the fourth axis. A rotation direction of the first rotor when viewed from the first transmission gear assembly is reverse to a rotation direction of the second rotor when viewed from the second transmission gear assembly while the vehicle is traveling.

The vehicle with this structure includes the front-wheel drive unit and the rear-wheel drive unit each including a rotary electric machine serving as a drive power source for the four-wheel drive unit. These drive units have, in their respective cases, the same positional relationship between the axis on which the rotary electric machine is located and the axis on which the differential gear assembly is located. Thus, the front-wheel drive unit and the rear-wheel drive unit can easily have partially or entirely the same internal structure and partially or entirely the same case structure. The four-wheel drive unit with this structure can include fewer components and have a lower cost. In addition, in the front-wheel drive unit, the first rotary electric machine is in the front direction from the second axis, or an axle to which the front wheels are coupled. In the rear-wheel drive unit, the second rotary electric machine is in the rear direction from the fourth axis, or an axle to which the rear wheels are coupled. Thus, a space can be easily left between the axle for the front wheels and the axle for the rear wheels. This space can easily receive a component, such as an electric storage device, and is usable for a cabin. As in the front-wheel drive unit, when, for example, the second rotary electric machine is in the front direction from the fourth axis, the rear seat may have an insufficient legroom. However, the vehicle with this structure can easily have a sufficient legroom in the rear seat for passenger comfort. More specifically, the vehicle with this structure including the four-wheel drive unit can be provided at a low cost.

Further aspects and features of the vehicle will be apparent from exemplary and nonlimiting embodiments described below with reference to the drawings.

DETAILED DESCRIPTION

Figure 1:
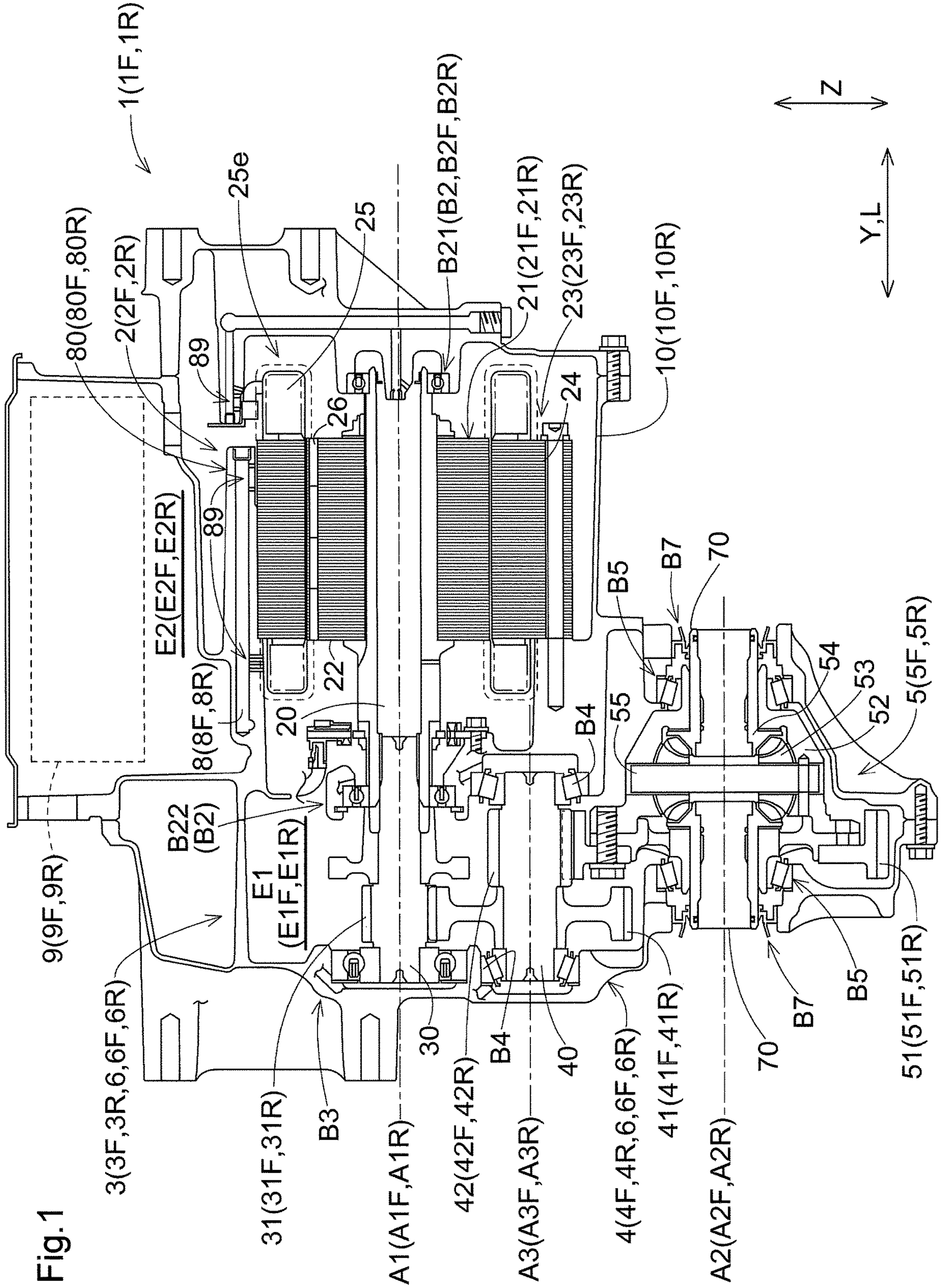
FIG. 1 is a cross-sectional view of a drive unit taken in an axial direction, showing its example basic structure.
Figure 2:
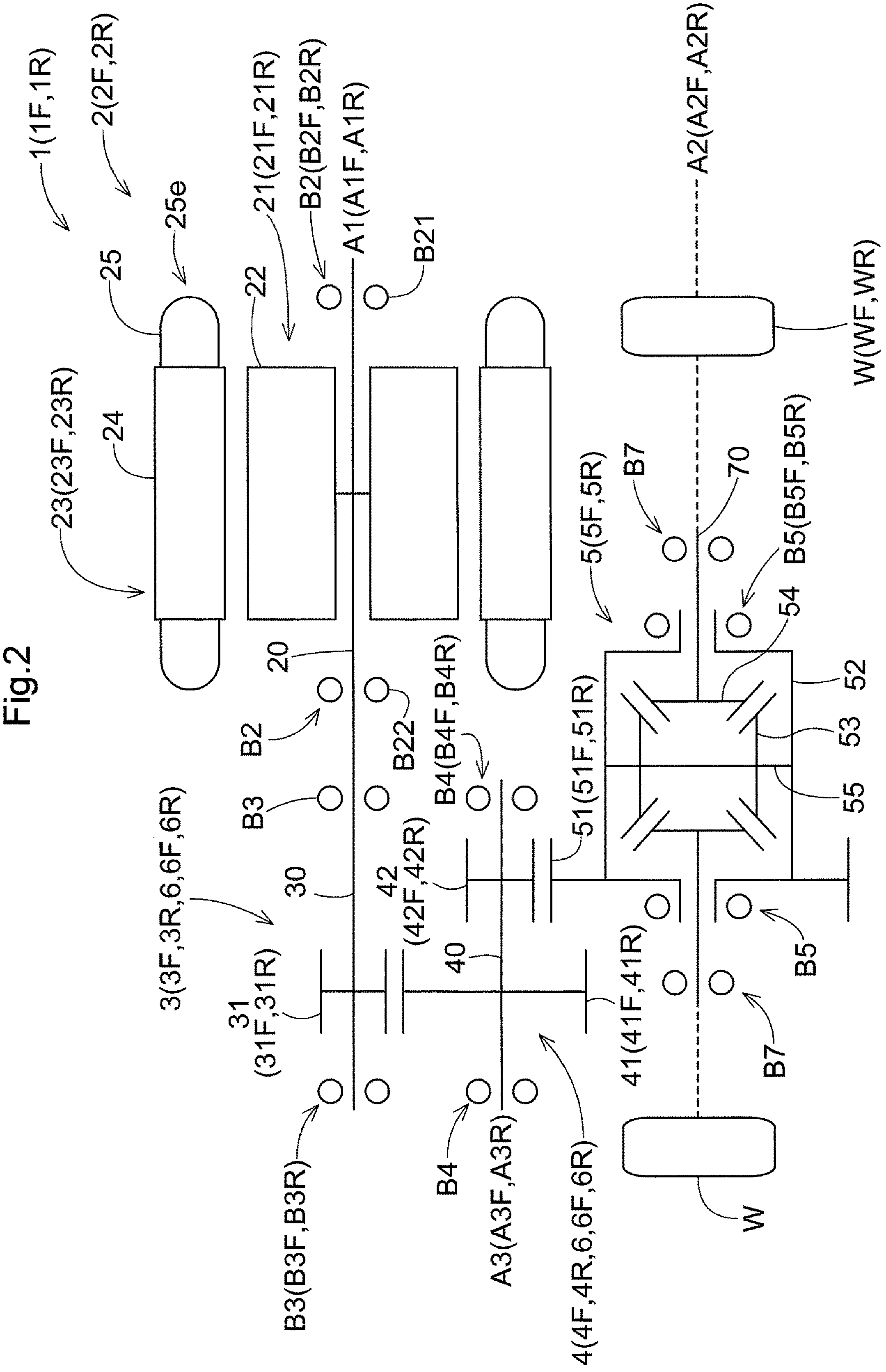
FIG. 2 is a skeleton diagram of the drive unit, showing its example basic structure.
Figure 3:
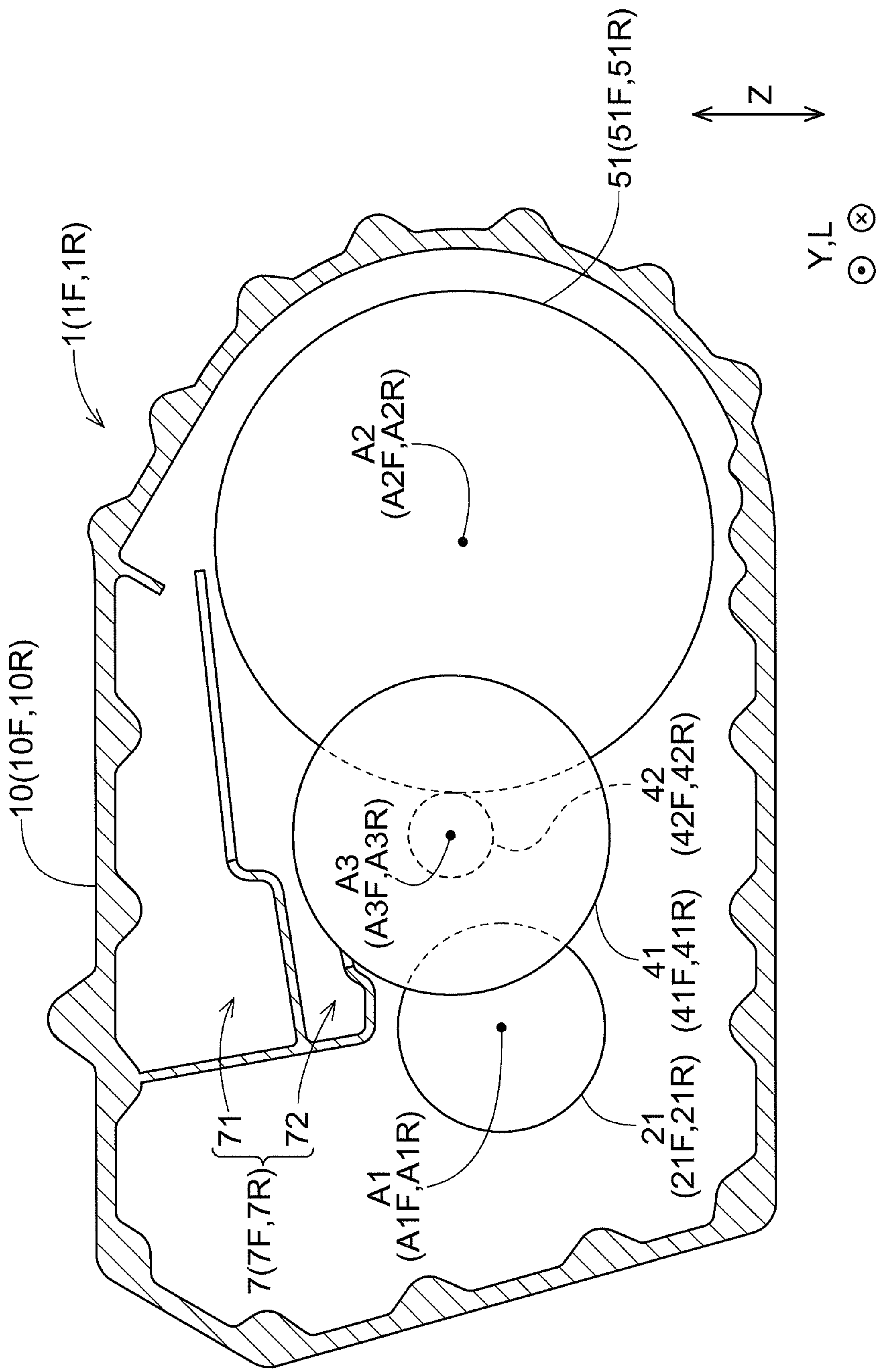
FIG. 3 is a schematic cross-sectional view of the drive unit perpendicular to the axis, showing its example basic structure.
Figure 4:
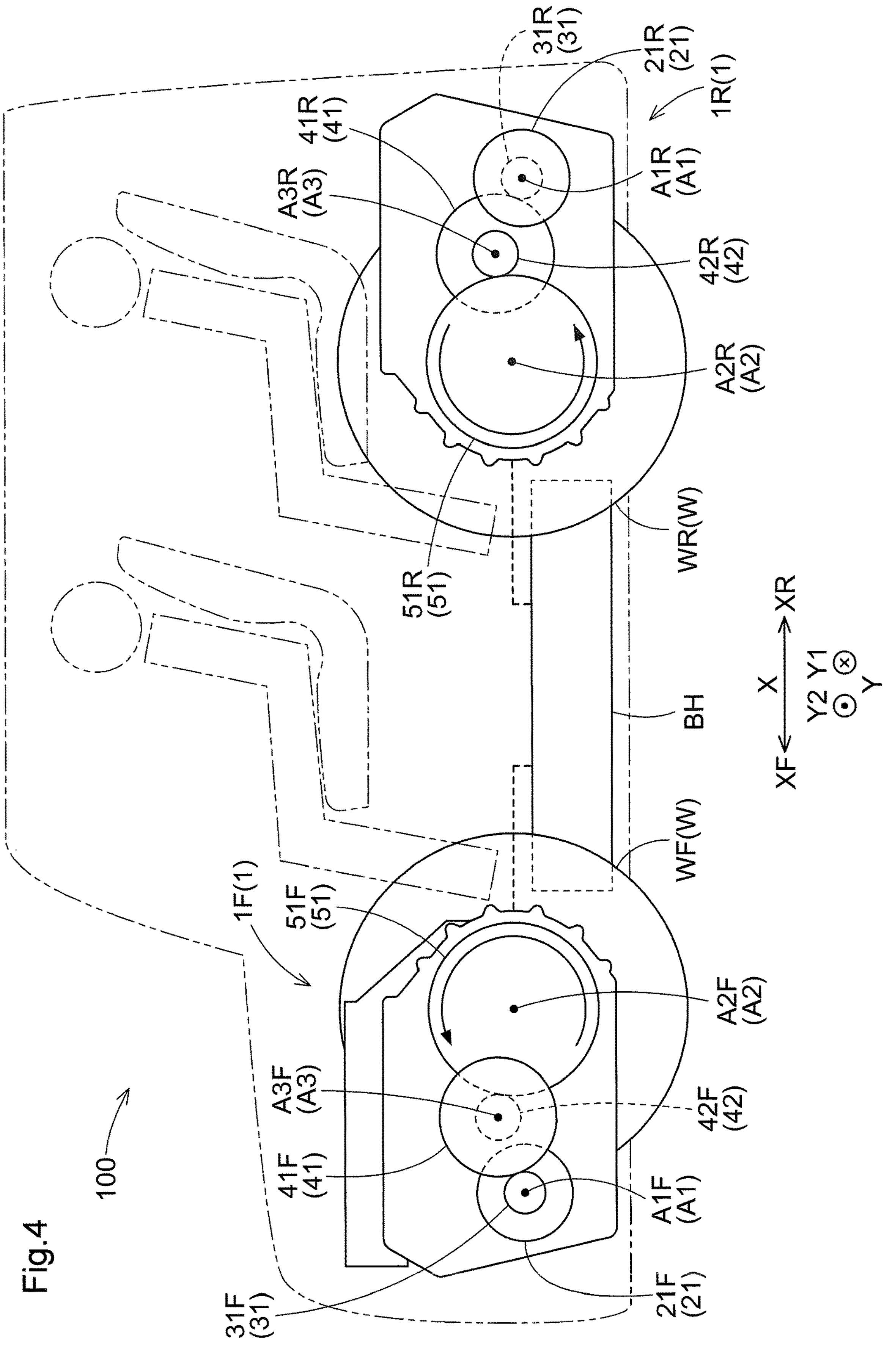
FIG. 4 is a schematic side view of an example vehicle including a front-wheel drive unit and a rear-wheel drive unit.

A vehicle according to an embodiment will now be described with reference to the drawings. As shown in FIG. 4, a vehicle 100 according to the present embodiment includes a front-wheel drive unit 1F that drives a pair of front wheels WF, and a rear-wheel drive unit 1R that drives a pair of rear wheels WR. In the present embodiment, the front-wheel drive unit 1F and the rear-wheel drive unit 1R have substantially the same structure except for specific portions. Unless otherwise noted, the specific portions of each drive unit are described as those of a drive unit 1 that drives a pair of wheels W. FIGS. 1, 2, and 3 show the structure of the drive unit 1.

A direction used in describing each component herein refers to a direction in the drive unit 1 mounted on a vehicle 100 (in an in-vehicle state). The terms associated with the dimensions, orientation, arrangement position, and other aspects of each component may have tolerances resulting from variations (variations allowable in manufacture). In the in-vehicle state, the direction along the rotation axis of the drive unit 1 (in the present embodiment, separate axes parallel to each other, such as A1 (A1F or A1R), A2 (A2F or A2R), and A3 (A3F or A3R) described in detail later) is referred to as an axial direction L. The directions perpendicular to the axes are referred to as radial directions of the axes. The direction perpendicular to the drive unit 1 mounted on the vehicle 100 is referred to as a vertical direction Z. When the drive unit 1 is mounted on the vehicle 100 with the axial direction L parallel to the horizontal plane, one of the radial directions matches the vertical direction Z.

As shown in, for example, FIGS. 1, 2, and 4, the front-wheel drive unit 1F includes a first rotary electric machine 2F including a first rotor 21F, a first differential gear assembly 5F that distributes a driving force transmitted to a first differential input gear 51F to the pair of front wheels WF, a first transmission gear assembly 6F that transmits the driving force between the first rotor 21F and the first differential input gear 51F, and a first case 10F. The first case 10F defines a first chamber E1F accommodating the first rotary electric machine 2F, the first differential gear assembly 5F, and the first transmission gear assembly 6F. The first rotor 21F is located on the front-wheel input axis A1F (first axis), and the first differential input gear 51F is located on the front-wheel output axis A2F (second axis) parallel to and different from the front-wheel input axis A1F.

The rear-wheel drive unit 1R includes a second rotary electric machine 2R including a second rotor 21R, a second differential gear assembly 5R that distributes a driving force transmitted to a second differential input gear 51R to the pair of rear wheels WR, a second transmission gear assembly 6R that transmits the driving force between the second rotor 21R and the second differential input gear 51R, and a second case 10R. The second case 10R defines a second chamber E1R accommodating the second rotary electric machine 2R, the second differential gear assembly 5R, and the second transmission gear assembly 6R. The second rotor 21R is located on the rear-wheel input axis A1R (third axis), and the second differential input gear 51R is located on the rear-wheel output axis A2R (fourth axis) parallel to and different from the rear-wheel input axis A1R.

As shown in FIG. 4, the direction from the rear wheels WR toward the front wheels WF along the axis in a vehicle front-rear direction X is referred to as a front direction XF, and the opposite direction is referred to as a rear direction XR. The direction perpendicular to the vehicle front-rear direction X when viewed in the vertical direction Z is referred to as a vehicle width direction Y. One direction along the axis in the vehicle width direction Y is referred to as a first width direction Y1, and the opposite direction is referred to as a second width direction Y2. As shown in FIG. 4, the front-wheel drive unit 1F includes the front-wheel input axis A1F (first axis) in the front direction XF from the front-wheel output axis A2F (second axis). The rear-wheel drive unit 1R includes the rear-wheel input axis A1R (third axis) in the rear direction XR from the rear-wheel output axis A2R (fourth axis). In other words, the front-wheel drive unit 1F and the rear-wheel drive unit 1R are mounted on the vehicle 100 with the axes having reverse positional relationships in the vehicle front-rear direction X.

Figure 5:
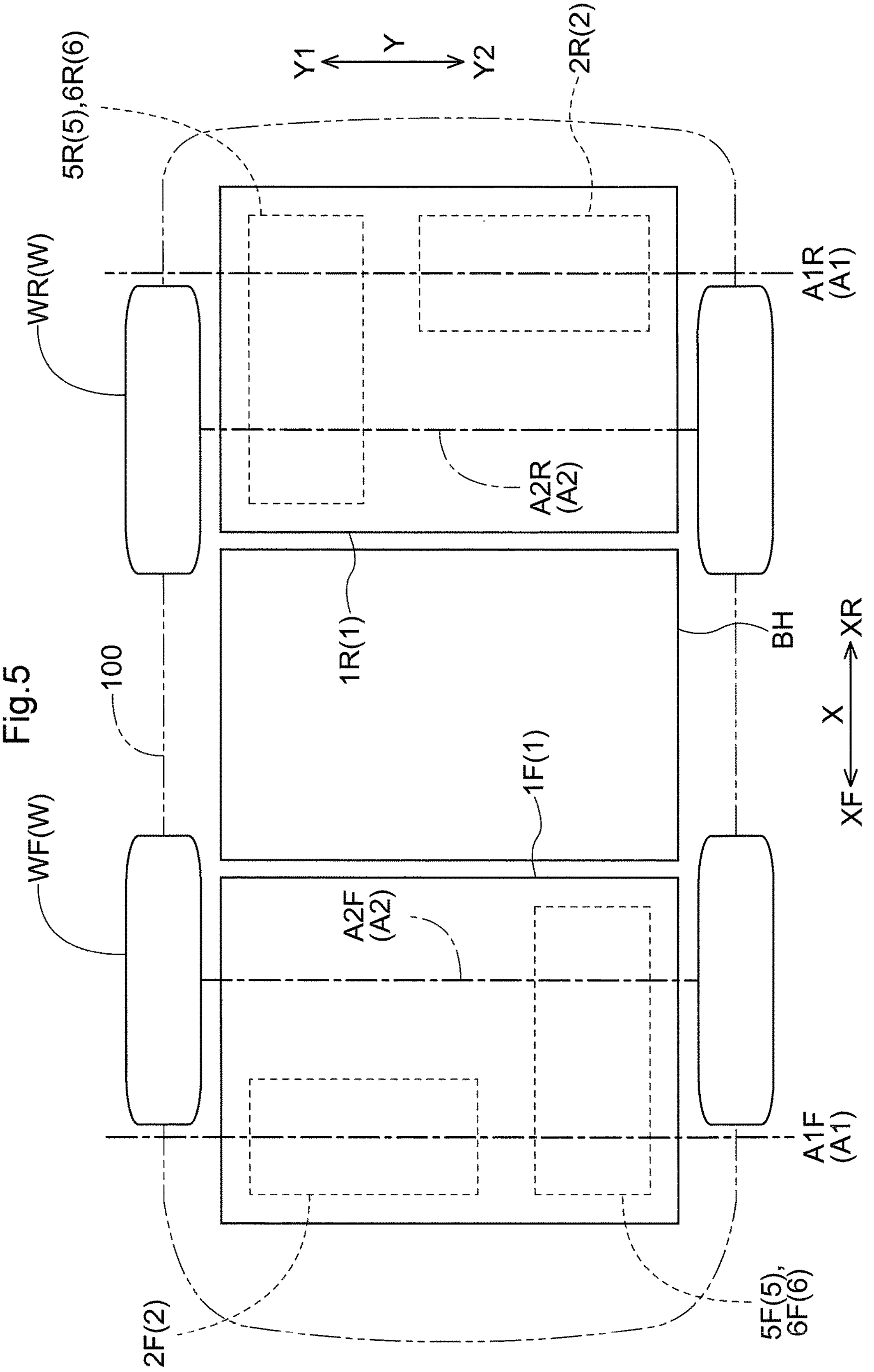
FIG. 5 is a schematic plan view of an example vehicle including the front-wheel drive unit and the rear-wheel drive unit.
Figure 6:
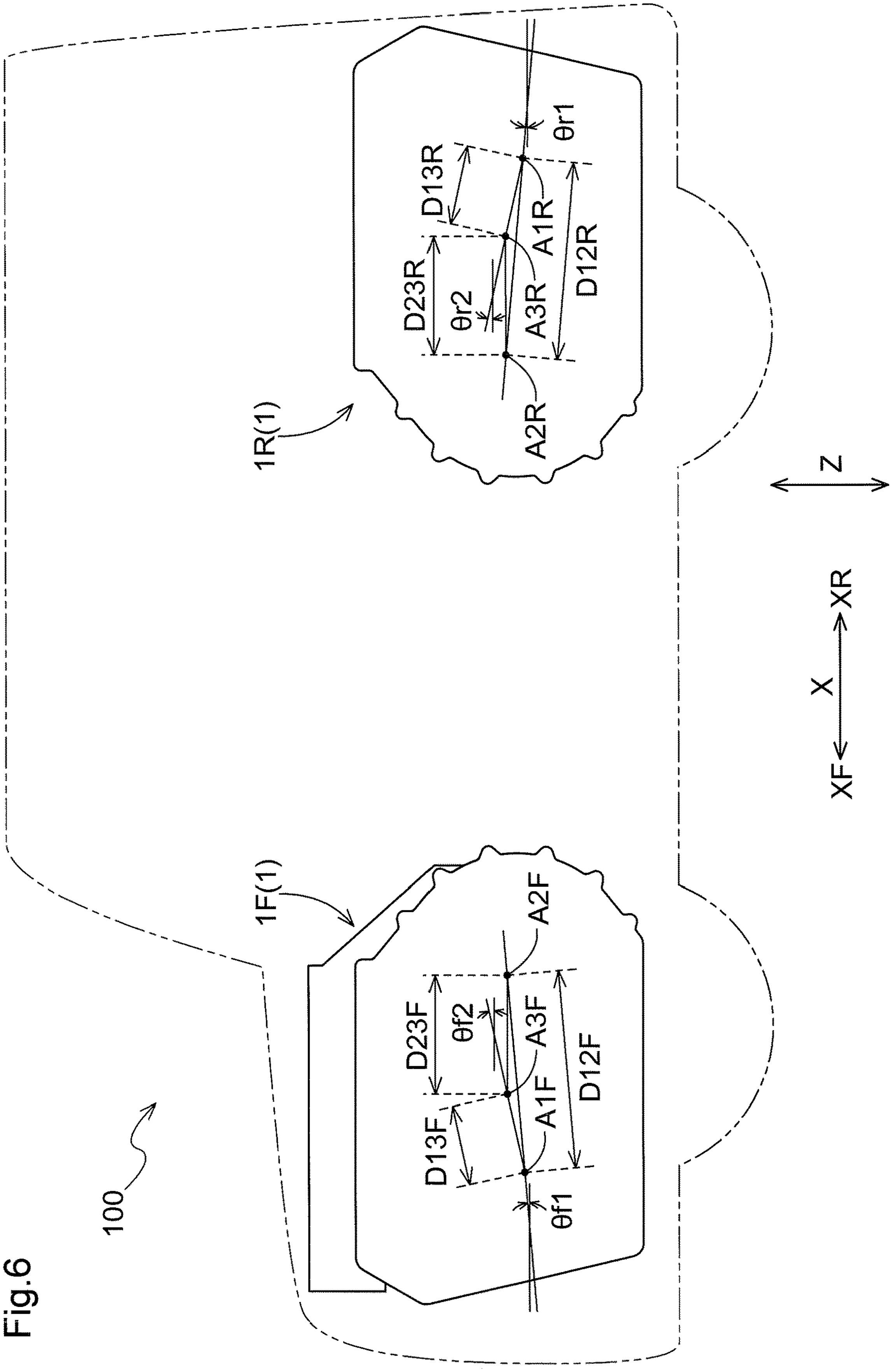
FIG. 6 is a diagram showing the arrangement of axes (such as a wheelbase) between the front-wheel drive unit and the rear-wheel drive unit.

As shown in FIG. 5, the front-wheel drive unit 1F includes the first rotor 21F in the first width direction Y1 (the far side on the page of FIG. 4) from the first transmission gear assembly 6F, and the rear-wheel drive unit 1R includes the second rotor 21R in the second width direction Y2 (the front side on the page of FIG. 4) from the second transmission gear assembly 6R. In other words, the front-wheel drive unit 1F and the rear-wheel drive unit 1R are mounted on the vehicle 100 with the positional relationship between the first rotary electric machine 2F and the first differential gear assembly 5F in the vehicle width direction Y (axial direction L) reverse to the positional relationship between the second rotary electric machine 2R and the second differential gear assembly 5R. As shown in FIG. 6, a front-wheel first wheelbase D12F, or a wheelbase between the front-wheel input axis A1F (first axis) and the front-wheel output axis A2F (second axis), is equal to a rear-wheel first wheelbase D12R, or a wheelbase between the rear-wheel input axis A1R (third axis) and the rear-wheel output axis A2R (fourth axis). In addition, while the vehicle 100 is traveling, the rotation direction of the first rotor 21F when viewed from the first transmission gear assembly 6F is reverse to the rotation direction of the second rotor 21R when viewed from the second transmission gear assembly 6R (described later in detail with reference to FIGS. 8 and 9).

Although detailed later, the front-wheel drive unit 1F and the rear-wheel drive unit 1R in the present embodiment have substantially the same structure except for specific portions as described above. The front-wheel drive unit 1F and the rear-wheel drive unit 1R are mounted on the vehicle 100 with, as described above, the axes having reverse positional relationship in the vehicle front-rear direction X, and the positional relationship between the first rotary electric machine 2F and the first differential gear assembly 5F in the vehicle width direction Y (axial direction L) reverse to the positional relationship between the second rotary electric machine 2R and the second differential gear assembly 5R. More specifically, the front-wheel drive unit 1F and the rear-wheel drive unit 1R, or the two drive units 1 having substantially the same structure, are mounted on the vehicle 100 with a relationship of rotational symmetry at 180 degrees about a virtual axis extending in the vertical direction Z.

Although detailed later, in the vehicle 100 according to the present embodiment including the front-wheel drive unit 1F and the rear-wheel drive unit 1R each serving as the four-wheel drive unit 1 including a rotary electric machine 2 (the first rotary electric machine 2F or the second rotary electric machine 2R) as a drive power source, these drive units 1 have, in their respective cases 10 (the first case 10F and the second case 10R), the same positional relationship between the two axes, or the input axis A1 (the front-wheel input axis A1F or the rear-wheel input axis A1R) on which the rotary electric machine 2 is located, and the output axis A2 (the front-wheel output axis A2F or the rear-wheel output axis A2R) on which a differential gear assembly 5 (the first differential gear assembly 5F or the second differential gear assembly 5R) is located. Thus, the front-wheel drive unit 1F and the rear-wheel drive unit 1R can easily have partially or entirely the same internal structure and partially or entirely the same case structure. The four-wheel drive unit 1 with this structure can include fewer components and have a lower cost. In other words, the vehicle 100 according to the present embodiment including the four-wheel drive unit 1 can be obtained at a lower cost.

In the front-wheel drive unit 1F, the first rotary electric machine 2F is in the front direction XF from the front-wheel output axis A2F (second axis), or an axle to which the front wheels WF are coupled. In the rear-wheel drive unit 1R, the second rotary electric machine 2R is in the rear direction XR from the rear-wheel output axis A2R (fourth axis), or an axle to which the rear wheels WR are coupled. Thus, a space can be easily left between the axle for the front wheels WF and the axle for the rear wheels WR. This space can easily receive a component, such as a high-voltage direct current (DC) power supply BH, and is usable for a cabin. As in the front-wheel drive unit 1F, when, for example, the second rotary electric machine 2R is in the front direction XF from the rear-wheel output axis A2R, the rear seat may have an insufficient legroom. However, the vehicle according to the present embodiment can easily have a sufficient legroom in the rear seat for passenger comfort.

The specific components in the drive unit 1 that are the same between the front-wheel drive unit 1F and the rear-wheel drive unit 1R will now be described. The drive unit 1 includes the rotary electric machine 2 including a rotor 21, a differential gear assembly 5 that distributes a driving force transmitted to the differential input gear 51 to the pair of wheels W, a transmission gear assembly 6 that transmits the driving force between the rotor 21 and the differential input gear 51, and the case 10. The case 10 defines a device chamber E1 accommodating the rotary electric machine 2, the differential gear assembly 5, and the transmission gear assembly 6. The rotor 21 corresponds to the first rotor 21F and the second rotor 21R, the rotary electric machine 2 corresponds to the first rotary electric machine 2F and the second rotary electric machine 2R, the differential input gear 51 corresponds to the first differential input gear 51F and the second differential input gear 51R, the differential gear assembly 5 corresponds to the first differential gear assembly 5F and the second differential gear assembly 5R, the wheels W correspond to the front wheels WF and the rear wheels WR, the transmission gear assembly 6 corresponds to the first transmission gear assembly 6F and the second transmission gear assembly 6R, and the device chamber E1 corresponds to the first chamber E1F and the second chamber E1R.

The rotor 21 is located on an input axis A1, and the differential input gear 51 is located on an output axis A2 parallel to and different from the input axis A1. The input axis A1 corresponds to the front-wheel input axis A1F (first axis) and the rear-wheel input axis A1R (third axis). The output axis A2 corresponds to the front-wheel output axis A2F (second axis) and the rear-wheel output axis A2R (fourth axis).

In the present embodiment, the rotary electric machine 2 serves as a drive source that drives the pair of wheels W. The structure according to the present embodiment includes, as the transmission gear assembly 6 that transmits the driving force between the rotor 21 and the differential input gear 51, a rotor output gear 31 that rotates integrally with the rotor 21, and a counter gear assembly 4. As described later, the rotor output gear 31 is located on the input axis A1, and the counter gear assembly 4 is located on a counter axis A3 parallel to and different from the input axis A1 and the output axis A2. As described later, the rotor output gear 31 corresponds to a first rotor output gear 31F in the front-wheel drive unit 1F and a second rotor output gear 31R in the rear-wheel drive unit 1R. The counter gear assembly 4 corresponds to a first counter gear assembly 4F in the front-wheel drive unit 1F and a second counter gear assembly 4R in the rear-wheel drive unit 1R. The counter axis A3 corresponds to the front-wheel counter axis A3F (fifth axis) in the front-wheel drive unit 1F and the rear-wheel counter axis A3R (sixth axis) in the rear-wheel drive unit 1R.

The rotary electric machine 2 is a rotary electric machine (a motor or a generator) that operates with, for example, polyphase (e.g., three-phase) alternating current (AC), and can function as a motor or a generator. The rotary electric machine 2 is powered by power from a DC power supply (the high-voltage DC power supply BH shown in FIG. 8), or supplies (regenerates) power generated with an inertial force of the vehicle 100 to the DC power supply. The rotary electric machine 2 is driven and controlled by a rotary electric machine controller 9 (refer to FIG. 8) including an inverter circuit PM that converts DC power and polyphase AC power. In the present embodiment, as shown in FIG. 1, the rotary electric machine controller 9 is also accommodated in the case 10. The case 10 defines, separately from the device chamber E1, an inverter chamber E2 (a third chamber E2F or a fourth chamber E2R) for accommodating the rotary electric machine controller 9.

The inverter circuit PM (a power module described later) is connected to the AC rotary electric machine 2 and the DC power supply, and converts power between the polyphase (e.g., three-phase) AC and DC. The high-voltage DC power supply BH serving as a DC power supply may be, for example, a secondary battery (a battery) such as a nickel-hydride battery or a lithium-ion battery, or an electric double-layer capacitor. As in the present embodiment, when the rotary electric machine 2 is a drive source for the wheels W, the power supply voltage of the rated current of the high-voltage DC power supply BH is, for example, 200 to 400 V.

Figure 8:
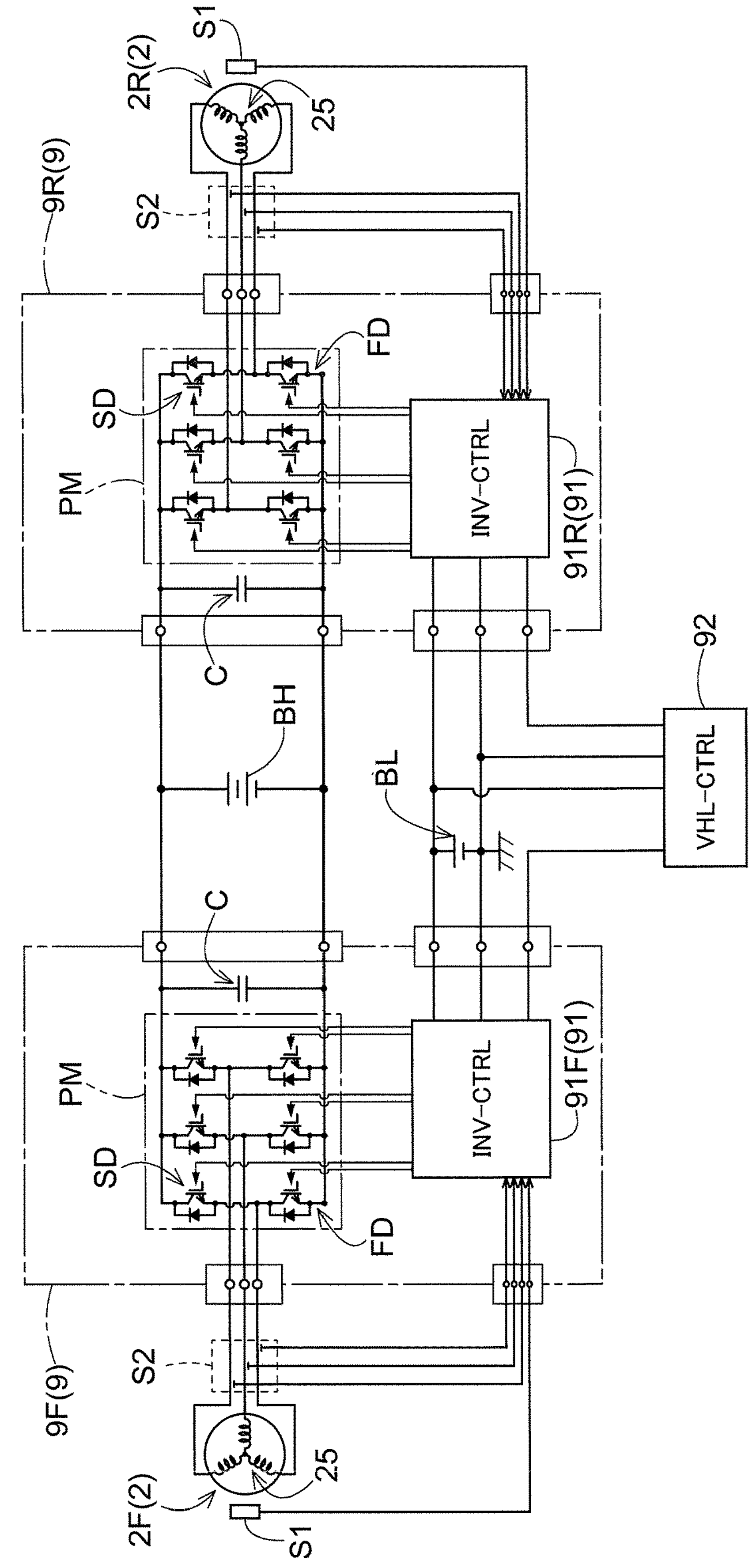
FIG. 8 is a schematic block diagram of a system that drives and controls a first rotary electric machine and a second rotary electric machine.

As shown in FIG. 8, the inverter circuit PM includes multiple switching devices SD. Examples of the switching devices SD may include power semiconductor devices that can operate at high frequencies, such as an insulated-gate bipolar transistor (IGBT), a power metal-oxide-semiconductor field-effect transistor (MOSFET), a silicon carbide-metal oxide semiconductor FET (SiC-MOSFET), a SiC static induction transistor (SiC-SIT), and a gallium nitride MOSFET (GaN-MOSFET). For example, the inverter circuit PM and a freewheel diode FD are integral as a single power module. A DC link capacitor C (smoothing capacitor) is located at the DC end of the inverter circuit PM to smooth the voltage (DC link voltage) between positive and negative electrodes.

The inverter circuit PM is controlled by an inverter controller 91 (a first inverter controller 91F or a second inverter controller 91R). The inverter controller 91 controls the rotary electric machine 2 through the inverter circuit PM based on instructions on the speed or torque from a vehicle controller 92 that is a host controller of the inverter controller 91 and controls the travel of the vehicle 100. The inverter controller 91 includes a logical circuit of, for example, a microcomputer as a core component, and drives and controls the rotary electric machine 2 through the inverter circuit PM through current feedback control based on, for example, the detection results from a rotation sensor S1 and a current sensor S2. The rotation sensor S1 is, for example, a resolver that detects the rotation of the rotor 21 (the rotational speed and the rotation position, or the magnetic pole positions of permanent magnets included in the rotor 21). The current sensor S2 detects AC flowing through a stator coil 25 (described later) in the rotary electric machine 2.

A microcomputer or another device included in the inverter controller 91 operates with power from a low-voltage DC power supply BL that supplies a voltage (e.g., 12 to 24 V) lower than the high-voltage DC power supply BH connected to the inverter circuit PM. Thus, the inverter controller 91 includes a drive circuit that enhances or relays the driving performance (the performance of, for example, the voltage amplitude or output power for operating the subsequent circuits) of a switching control signal (a gate drive signal for an IGBT) on each switching device SD. The inverter controller 91 includes one or more substrates, on which the above microcomputer, peripheral circuitry, and circuit components forming a drive circuit are mounted.

The rotary electric machine controller 9 is unitized with the above inverter controller 91, the DC link capacitor C, and the inverter circuit PM (power module). The rotary electric machine controller 9 is located in the inverter chamber E2 in the case 10, and is fastened to the case 10 with a fastener such as a bolt.

The first rotary electric machine 2F and the second rotary electric machine 2R are separately driven and controlled. Thus, the rotary electric machine controller 9 corresponds to a first controller 9F that drives and controls the first rotary electric machine 2F and a second controller 9R that drives and controls the second rotary electric machine 2R. Similarly, the inverter controller 91 corresponds to the first inverter controller 91F included in the first controller 9F and the second inverter controller 91R included in the second controller 9R. The first inverter controller 91F and the second inverter controller 91R have the same structure. The first controller 9F and the second controller 9R each include the inverter circuit PM (power module) with the same structure, and the DC link capacitor C with the same structure. More specifically, the first controller 9F and the second controller 9R have the same circuit structure including circuit components with the same electric characteristics.

The inverter chamber E2 described above corresponds to the third chamber E2F, included in the first case 10F, accommodating the first controller 9F and the fourth chamber E2R, included in the second case 10R, accommodating the second controller 9R. The first controller 9F and the second controller 9R have the same circuit structure including the circuit components with the same electric characteristics. The front-wheel drive unit 1F and the rear-wheel drive unit 1R can thus easily have the same case structure.

For the same case structure, the first case 10F of the front-wheel drive unit 1F and the second case 10R of the rear-wheel drive unit 1R can be cast using the same mold. In other words, casting the first case 10F and the second case 10R using the same mold allows the front-wheel drive unit 1F and the rear-wheel drive unit 1R to easily have partially or entirely the same internal structure and partially or entirely the same case structure.

In the present embodiment, the device chamber E1 and the inverter chamber E2 are integral. In other words, the case 10 includes an integral body defining the device chamber E1 accommodating the components such as the rotary electric machine 2 and the inverter chamber E2 accommodating the rotary electric machine controller 9. Being integral indicates an integrated component formed from the same material as, for example, a die casting.

The rotary electric machine 2 includes a stator 23 fixed to, for example, the case 10, and the rotor 21 supported radially inward from the stator 23 in a rotatable manner. In the present embodiment, the stator 23 includes a stator core 24 and a stator coil 25 wound around the stator core 24. The rotor 21 includes a rotor core 22 and permanent magnets 26 located on the rotor core 22. As in the rotor 21 (the first rotor 21F and the second rotor 21R), to distinguish the first rotary electric machine 2F and the second rotary electric machine 2R from each other, the stator 23 in the first rotary electric machine 2F is referred to as a first stator 23F, and the stator 23 in the second rotary electric machine 2R is referred to as a second stator 23R.

The rotor 21 in the rotary electric machine 2 is connected to a rotor axis 20 that rotates integrally with the rotor 21. A rotor connecting axis 30 is connected to the rotor axis 20 to rotate integrally with the rotor axis 20. The rotor axis 20 is rotatably supported on the case 10 with a rotor bearing B2. The rotor connecting axis 30 is rotatably supported on the case 10 with an input bearing B3. The rotor output gear 31 is located on the rotor connecting axis 30 to rotate integrally with the rotor connecting axis 30. More specifically, the drive unit 1 includes a power input assembly 3 including the rotor connecting axis 30 and the rotor output gear 31.

The rotor axis 20 in the rotary electric machine 2 is supported, with a first rotor bearing B21, on the end of the rotor 21 opposite from the rotor connecting axis 30 (rotor output gear 31) in the axial direction L, and supported, with a second rotor bearing B22, on the end of the rotor 21 adjacent to the rotor connecting axis 30 (rotor output gear 31) in the axial direction L. As described later, the rotor output gear 31 meshes with a first counter gear 41 in the counter gear assembly 4. More specifically, the rotor output gear 31 functions as a portion of the transmission gear assembly 6 and rotates integrally with the rotor 21 to transmit a driving force from the rotary electric machine 2 to the counter gear assembly 4.

To distinguish the bearings in the front-wheel drive unit 1F and the rear-wheel drive unit 1R from each other, the front-wheel drive unit 1F includes a front-wheel rotor bearing B2F as the rotor bearing B2 and a front-wheel input bearing B3F as the input bearing B3 whereas the rear-wheel drive unit 1R includes a rear-wheel rotor bearing B2R as the rotor bearing B2 and a rear-wheel input bearing B3R as the input bearing B3. Similarly, the front-wheel drive unit 1F includes a first power input assembly 3F as the power input assembly 3 and the first rotor output gear 31F as the rotor output gear 31 whereas the rear-wheel drive unit 1R includes a second power input assembly 3R as the power input assembly 3 and the second rotor output gear 31R as the rotor output gear 31.

The differential gear assembly 5 is located on the output axis A2 and distributes a driving force transmitted from the rotary electric machine 2 to the pair of wheels W. The differential gear assembly 5 includes multiple bevel gears (pinion gears 53 and differential output gears 54) that mesh with one another and a differential case 52 accommodating the multiple bevel gears. The differential case 52 is rotatably supported on the case 10 with differential bearings B5. The differential gear assembly 5 transmits the rotation and torque input into the differential input gear 51 from the rotary electric machine 2 to a pinion axis 55 extending in the radial direction of the output axis A2 and rotating integrally with the differential input gear 51, and distributes and transmits the rotation and torque to a pair of output members 70 through the pair of differential output gears 54 meshing with the pinion gears 53 rotatably supported on the pinion axis 55. The output members 70 are rotatably supported on the case 10 with output bearings B7. To distinguish the front-wheel drive unit 1F and the rear-wheel drive unit 1R from each other, the front-wheel drive unit 1F includes, on the front-wheel output axis A2F, the first differential gear assembly 5F including the first differential input gear 51F whereas the rear-wheel drive unit 1R includes, on the rear-wheel output axis A2R, the second differential gear assembly 5R including the second differential input gear 51R.

The counter gear assembly 4 located on the counter axis A3 drives and connects the rotary electric machine 2 and the differential gear assembly 5 (differential input gear 51) with the rotor output gear 31. A counter connecting axis 40 is rotatably supported on the case 10 with counter bearings B4. In the present embodiment, the counter gear assembly 4 includes the first counter gear 41 and a second counter gear 42 connected to each other with the counter connecting axis 40. The first counter gear 41 meshes with the rotor output gear 31. The second counter gear 42 connected to the first counter gear 41 with the counter connecting axis 40 meshes with the differential input gear 51. More specifically, the counter gear assembly 4 functions as a part of the transmission gear assembly 6, and transmits a driving force transmitted from the rotary electric machine 2 to the differential input gear 51 through the rotor output gear 31.

To distinguish the front-wheel drive unit 1F and the rear-wheel drive unit 1R from each other, the front-wheel drive unit 1F includes, as the counter gear assembly 4, the first counter gear assembly 4F including a front-wheel first counter gear 41F (first gear) and a front-wheel second counter gear 42F (second gear). The rear-wheel drive unit 1R includes, as the counter gear assembly 4, the second counter gear assembly 4R including a rear-wheel first counter gear 41R (third gear) and a rear-wheel second counter gear 42R (fourth gear).

More specifically, the first transmission gear assembly 6F in the front-wheel drive unit 1F includes the first rotor output gear 31F that rotates integrally with the first rotor 21F, and the first counter gear assembly 4F. The first counter gear assembly 4F includes the front-wheel first counter gear 41F (first gear), and the front-wheel second counter gear 42F (second gear) that rotates integrally with the front-wheel first counter gear 41F (first gear). The front-wheel first counter gear 41F (first gear) and the first rotor output gear 31F mesh with each other, and the front-wheel second counter gear 42F (second gear) and the first differential input gear 51F mesh with each other. The second transmission gear assembly 6R includes the second rotor output gear 31R that rotates integrally with the second rotor 21R, and the second counter gear assembly 4R. The second counter gear assembly 4R includes the rear-wheel first counter gear 41R (third gear), and the rear-wheel second counter gear 42R (fourth gear) that rotates integrally with the rear-wheel first counter gear 41R (third gear). The rear-wheel first counter gear 41R (third gear) and the second rotor output gear 31R mesh with each other, and the rear-wheel second counter gear 42R (fourth gear) and the second differential input gear 51R mesh with each other.

As described above, the front-wheel drive unit 1F and the rear-wheel drive unit 1R are mounted on the vehicle 100 with the positional relationship between the first rotary electric machine 2F and the first differential gear assembly 5F in the vehicle width direction Y (axial direction L) reverse to the positional relationship between the second rotary electric machine 2R and the second differential gear assembly 5R. More specifically, the front-wheel drive unit 1F and the rear-wheel drive unit 1R, or the two drive units 1 having substantially the same structure, are mounted on the vehicle 100 with a relationship of rotational symmetry at 180 degrees about a virtual axis extending in the vertical direction Z. Similarly, in the counter gear assembly 4, the position of the front-wheel second counter gear 42F (second gear) relative to the front-wheel first counter gear 41F (first gear) is reverse to the position of the rear-wheel second counter gear 42R (fourth gear) relative to the rear-wheel first counter gear 41R (third gear) in the vehicle width direction Y. As described above, the first transmission gear assembly 6F and the second transmission gear assembly 6R have the same structure, and thus the front-wheel drive unit 1F and the rear-wheel drive unit 1R can easily have the same internal structure.

In the present embodiment, as described above, the front-wheel drive unit 1F and the rear-wheel drive unit 1R, or the two drive units 1 having substantially the same structure, are mounted on the vehicle 100 with a relationship of rotational symmetry at 180 degrees about a virtual axis extending in the vertical direction Z. Thus, as described above with reference to FIG. 6, the front-wheel first wheelbase D12F between the front-wheel input axis A1F (first axis) and the front-wheel output axis A2F (second axis) is equal to the rear-wheel first wheelbase D12R between the rear-wheel input axis A1R (third axis) and the rear-wheel output axis A2R (fourth axis). In addition, as shown in FIG. 6, a front-wheel first angle θf1, or an angle between the horizontal plane and a plane including the front-wheel input axis A1F (first axis) and the front-wheel output axis A2F (second axis), is equal to a rear-wheel first angle θr1, or an angle between the horizontal plane and a plane including the rear-wheel input axis A1R (third axis) and the rear-wheel output axis A2R (fourth axis). More specifically, the front-wheel drive unit 1F and the rear-wheel drive unit 1R have the same positional relationship between the rotary electric machine 2 and the differential gear assembly 5 and can thus easily have the same internal structure. In this example, equal angles refer to the angles with the absolute values equal independent of their orientations.

As described above, the first transmission gear assembly 6F includes the first counter gear assembly 4F located on the front-wheel counter axis A3F (fifth axis) parallel to and different from the front-wheel input axis A1F (first axis) and the front-wheel output axis A2F (second axis). The second transmission gear assembly 6R includes the second counter gear assembly 4R located on the rear-wheel counter axis A3R (sixth axis) parallel to and different from the rear-wheel input axis A1R (third axis) and the rear-wheel output axis A2R (fourth axis). As shown in FIG. 6, the wheelbases D12F, D23F, and D13F between the front-wheel input axis A1F (first axis), the front-wheel output axis A2F (second axis), and the front-wheel counter axis A3F (fifth axis) are equal to the wheelbases D12R, D23R, and D13R between the rear-wheel input axis A1R (third axis), the rear-wheel output axis A2R (fourth axis), and the rear-wheel counter axis A3R (sixth axis).

More specifically, the front-wheel first wheelbase D12F is equal to the rear-wheel first wheelbase D12R, and the front-wheel second wheelbase D23F, or the wheelbase between the front-wheel output axis A2F (second axis) and the front-wheel counter axis A3F (fifth axis), is equal to the rear-wheel second wheelbase D23R, or the wheelbase between the rear-wheel output axis A2R (fourth axis) and the rear-wheel counter axis A3R (sixth axis). In addition, the front-wheel third wheelbase D13F, or the wheelbase between the front-wheel input axis A1F (first axis) and the front-wheel counter axis A3F (fifth axis), is equal to the rear-wheel third wheelbase D13R, or the wheelbase between the rear-wheel input axis A1R (third axis) and the rear-wheel counter axis A3R (sixth axis). More specifically, in the present embodiment, the front-wheel drive unit 1F and the rear-wheel drive unit 1R have the same positional relationship between the two axes, or the axis (input axis A1) on which the rotary electric machine 2 is located and the axis (output axis A2) on which the differential gear assembly 5 is located, as well as the same positional relationship between each of the two axes and the axis (counter axis A3) in the counter gear assembly 4. Thus, the front-wheel drive unit 1F and the rear-wheel drive unit 1R can easily have partially or entirely the same internal structure and partially or entirely the same case structure.

As described above with reference to FIG. 6, the front-wheel first angle θf1 is equal to the rear-wheel first angle θr1. In addition, a front-wheel second angle θf2 is equal to a rear-wheel second angle θr2. More specifically, the front-wheel second angle θf2, or an angle between the horizontal plane and a plane including the front-wheel input axis A1F (first axis) and the front-wheel counter axis A3F (fifth axis), is equal to the rear-wheel second angle θr2, or an angle between the horizontal plane and a plane including the rear-wheel input axis A1R (third axis) and the rear-wheel counter axis A3R (sixth axis). In other words, the front-wheel drive unit 1F and the rear-wheel drive unit 1R have the same positional relationship between the rotary electric machine 2 and the counter gear assembly 4, in addition to having the same positional relationship between the rotary electric machine 2 and the differential gear assembly 5. The front-wheel drive unit 1F and the rear-wheel drive unit 1R can thus easily have the same internal structure.

In other words, as described below, a first included angle θ1 in the front-wheel drive unit 1F is equal to a third included angle θ3 in the rear-wheel drive unit 1R, a second included angle θ2 in the front-wheel drive unit 1F is equal to a fourth included angle θ4 in the rear-wheel drive unit 1R, and a fifth included angle θ5 in the front-wheel drive unit 1F is equal to a sixth included angle θ6 in the rear-wheel drive unit 1R. The first included angle θ1 is an angle between the plane including the front-wheel input axis A1F (first axis) and the front-wheel output axis A2F (second axis) and the plane including the front-wheel input axis A1F (first axis) and the front-wheel counter axis A3F (fifth axis), and the third included angle θ3 is an angle between the plane including the rear-wheel input axis A1R (third axis) and the rear-wheel output axis A2R (fourth axis) and the plane including the rear-wheel input axis A1R (third axis) and the rear-wheel counter axis A3R (sixth axis). The second included angle θ2 is an angle between the plane including the front-wheel output axis A2F (second axis) and the front-wheel input axis A1F (first axis) and the plane including the front-wheel output axis A2F (second axis) and the front-wheel counter axis A3F (fifth axis), and the fourth included angle θ4 is an angle between the plane including the rear-wheel output axis A2R (fourth axis) and the rear-wheel input axis A1R (third axis) and the plane including the rear-wheel output axis A2R (fourth axis) and the rear-wheel counter axis A3R (sixth axis). The fifth included angle θ5 is an angle between the plane including the front-wheel counter axis A3F (fifth axis) and the front-wheel input axis A1F (first axis) and the plane including the front-wheel counter axis A3F (fifth axis) and the front-wheel output axis A2F (second axis), and the sixth included angle θ6 is an angle between the plane including the rear-wheel counter axis A3R (sixth axis) and the rear-wheel input axis A1R (third axis) and the plane including the rear-wheel counter axis A3R (sixth axis) and the rear-wheel output axis A2R (fourth axis). When the front-wheel drive unit 1F and the rear-wheel drive unit 1R have the same positional relationship between the rotary electric machine 2, the differential gear assembly 5, and the counter gear assembly 4, the front-wheel drive unit 1F and the rear-wheel drive unit 1R can easily have the same internal structure.

As shown in FIG. 1, the inverter chamber E2 accommodating the rotary electric machine controller 9 is at a higher position Z1 than the device chamber E1 in the vertical direction Z to overlap the rotary electric machine 2 when viewed vertically. Thus, as shown in FIG. 4, independent of when the front-wheel drive unit 1F, the high-voltage DC power supply BH, and the rear-wheel drive unit 1R are aligned in the vehicle front-rear direction X, the front-wheel drive unit 1F and the high-voltage DC power supply BH can be electrically connected to each other as appropriate, and the rear-wheel drive unit 1R and the high-voltage DC power supply BH can also be electrically connected to each other as appropriate.

The drive unit 1 includes an oil pump (not shown) to supply lubricant oil and cooling oil to the rotary electric machine 2, the transmission gear assembly 6, the differential gear assembly 5, and bearings that support these components, some of which may receive oil splashed by the gears accommodated in the case 10. The case 10 includes, specifically in a lower portion of the device chamber E1, an oil reservoir to store oil dropping after being used for lubrication and cooling. Oil stored in the oil reservoir is splashed by the gear (e.g., the differential input gear 51) included in the drive unit 1. The splashed oil is directly supplied to lubrication target portions such as bearings and is stored into a catch tank 7 (refer to FIG. 3) located in the case 10. The stored oil is then supplied to the lubrication target portions through the catch tank 7. In the present embodiment, as shown in FIG. 3, the drive unit 1 includes an upper catch tank 71 at a higher position Z1 in the vertical direction Z, and a lower catch tank 72 at a lower position Z1 in the vertical direction Z. The upper catch tank 71 and the lower catch tank 72 are continuous with each other to supply oil stored in the upper catch tank 71 through an orifice to the lower catch tank 72. Oil stored in the upper catch tank 71 and the lower catch tank 72 is supplied to target portions through the orifice.

Figure 9:
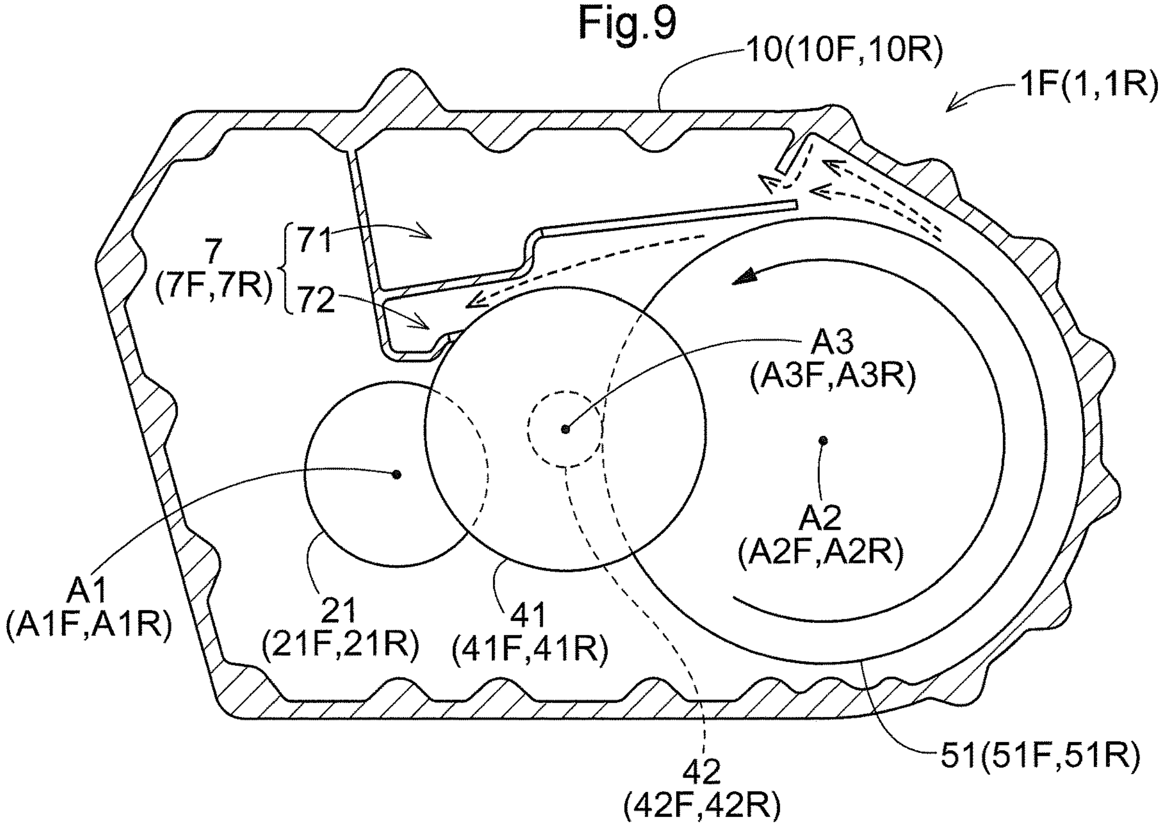
FIG. 9 is a diagram showing an example of guiding oil into a first catch tank when the front-wheel drive unit is in a forward rotation state.
Figure 10:
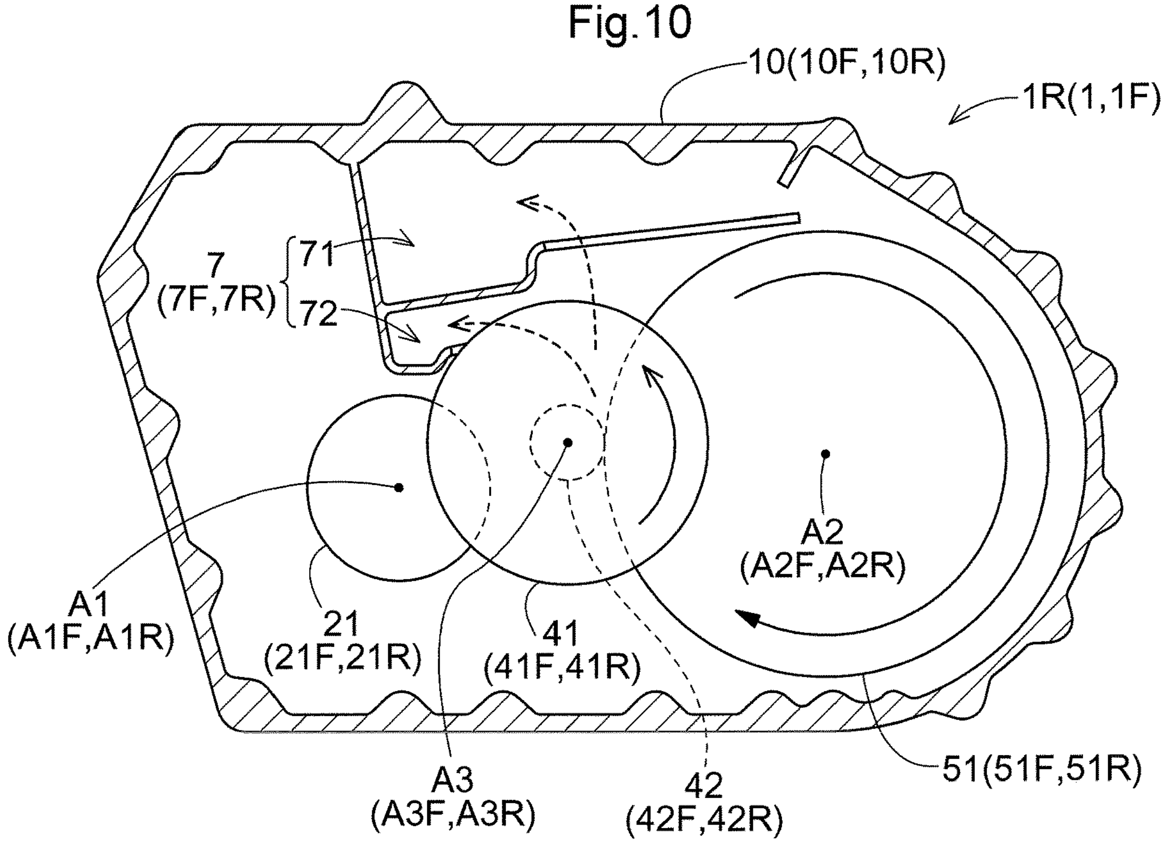
FIG. 10 is a diagram showing an example of guiding oil into a second catch tank when the rear-wheel drive unit is in a forward rotation state.

As shown in FIGS. 3, 9, and 10, the front-wheel drive unit 1F includes a first catch tank 7F that stores oil splashed through rotation of the first differential input gear 51F and the gears included in the first transmission gear assembly 6F. The rear-wheel drive unit 1R includes a second catch tank 7R that stores oil splashed through rotation of the second differential input gear 51R and the gears included in the second transmission gear assembly 6R. The state in which the front wheels WF and the rear wheels WR are rotating to move the vehicle 100 forward is referred to as a forward rotation state, and the state in which these wheels are rotating to move the vehicle 100 backward is referred to as a reverse rotation state. FIG. 9 shows an example of guiding oil into the first catch tank 7F when the front-wheel drive unit 1F is in the forward rotation state. FIG. 10 shows an example of guiding oil into the second catch tank 7R when the rear-wheel drive unit 1R is in the forward rotation state. In other words, FIG. 9 also shows an example of guiding oil into the second catch tank 7R when the rear-wheel drive unit 1R is in the reverse rotation state, and FIG. 10 also shows an example of guiding oil into the first catch tank 7F when the front-wheel drive unit 1F is in the reverse rotation state.

When the front wheels WF are in the forward rotation state, as shown in FIG. 9, the first catch tank 7F stores oil splashed by the first differential input gear 51F. Oil splashed by the first differential input gear 51F with a large diameter can easily reach the upper catch tank 71. The upper catch tank 71 is thus filled with sufficient oil.

When the rear wheels WR are in the forward rotation state, as shown in FIG. 10, the second catch tank 7R stores oil splashed by the second differential input gear 51R and the gears (specifically, the rear-wheel first counter gear 41R and the rear-wheel second counter gear 42R) included in the second transmission gear assembly 6R. More specifically, oil mainly splashed by the second differential input gear 51R is further splashed by the rear-wheel second counter gear 42R and the rear-wheel first counter gear 41R meshing with the second differential input gear 51R and is guided into the second catch tank 7R. The second differential input gear 51R with a large diameter rotates in the opposite direction from the front-wheel drive unit 1F. Thus, oil directly splashed by the second differential input gear 51R and guided into the upper catch tank 71 is less than that in the front-wheel drive unit 1F, but can be guided into at least the lower catch tank 72 in cooperation with the gears of the counter gear assembly 4. When the vehicle 100 travels at a high speed and the drive unit 1 rotates at a high speed and the upper catch tank 71 has no bottom at a higher position Z1 than the first counter gear 41, oil is also guided into the upper catch tank 71.

When the front wheels WF are in the reverse rotation state, as shown in FIG. 10, the first catch tank 7F stores oil splashed by the first differential input gear 51F and the gears (specifically, the front-wheel first counter gear 41F and the front-wheel second counter gear 42F) included in the first transmission gear assembly 6F. More specifically, oil mainly splashed by the first differential input gear 51F is further splashed by the front-wheel second counter gear 42F and the front-wheel first counter gear 41F meshing with the first differential input gear 51F and guided into the first catch tank 7F. When the rear wheels WR are in the reverse rotation state, as shown in FIG. 9, the second catch tank 7R stores oil splashed by the second differential input gear 51R. The details are the same as those described above for the forward rotation state as an example and thus are not described in detail.

Thus, the first catch tank 7F stores oil splashed by at least the first differential input gear 51F or the gears included in the first transmission gear assembly 6F independent of when the front wheels WF are in the forward or reverse rotation state. The second catch tank 7R stores oil splashed by at least the second differential input gear 51R or the gears included in the second transmission gear assembly 6R independent of when the rear wheels WR are in the forward or reverse rotation state.

In this structure, the catch tank 7 can store oil as appropriate independent of when the front-wheel drive unit 1F and the rear-wheel drive unit 1R are located in the opposite directions from each other in the vehicle front-rear direction X. This structure can thus supply oil to target portions as appropriate through the catch tank 7. Thus, the front-wheel drive unit 1F and the rear-wheel drive unit 1R can easily have the same structure.

Figure 11:
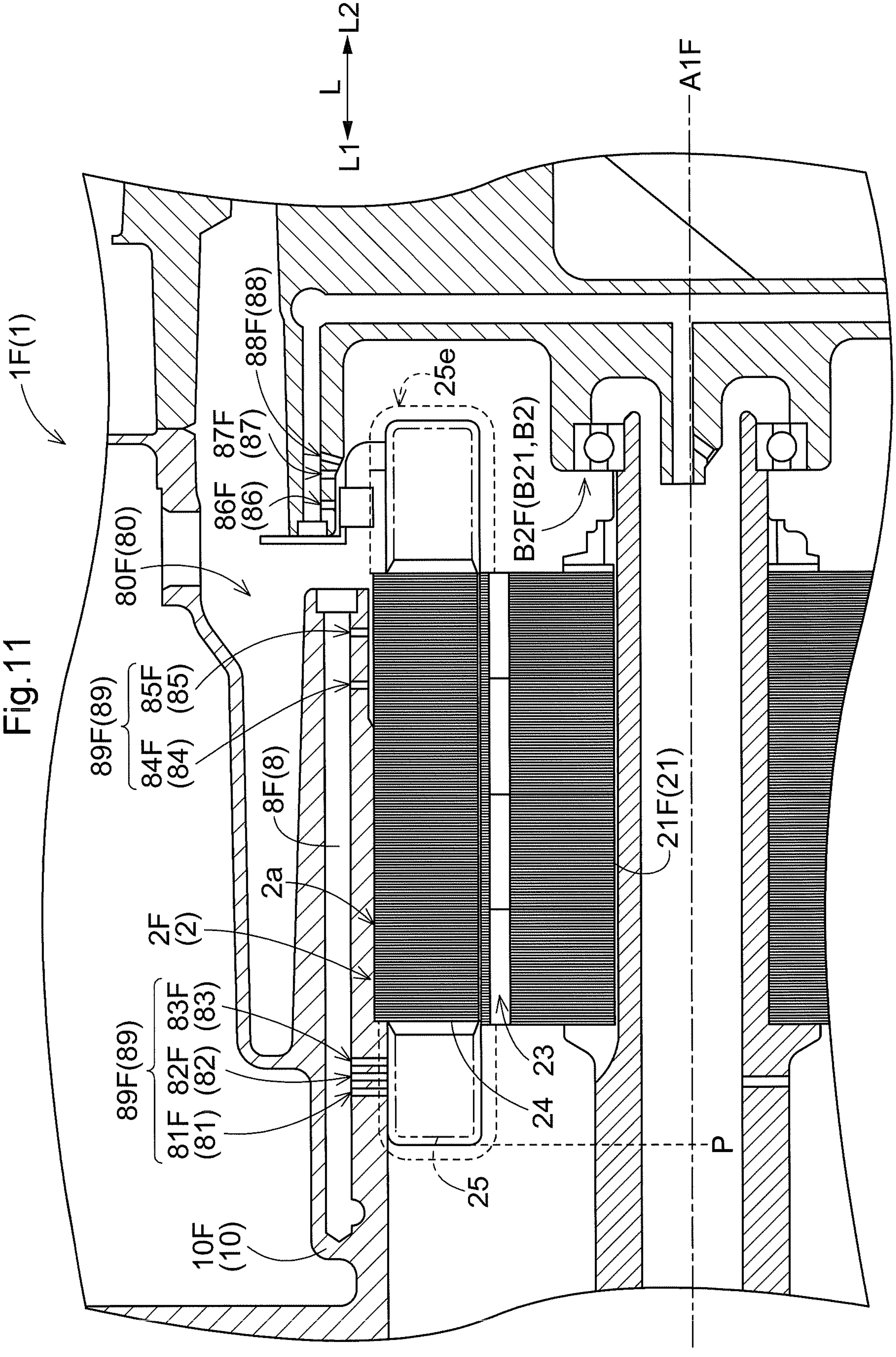
FIG. 11 is a diagram showing an example supply of oil to the first rotary electric machine through a first oil passage.
Figure 12:
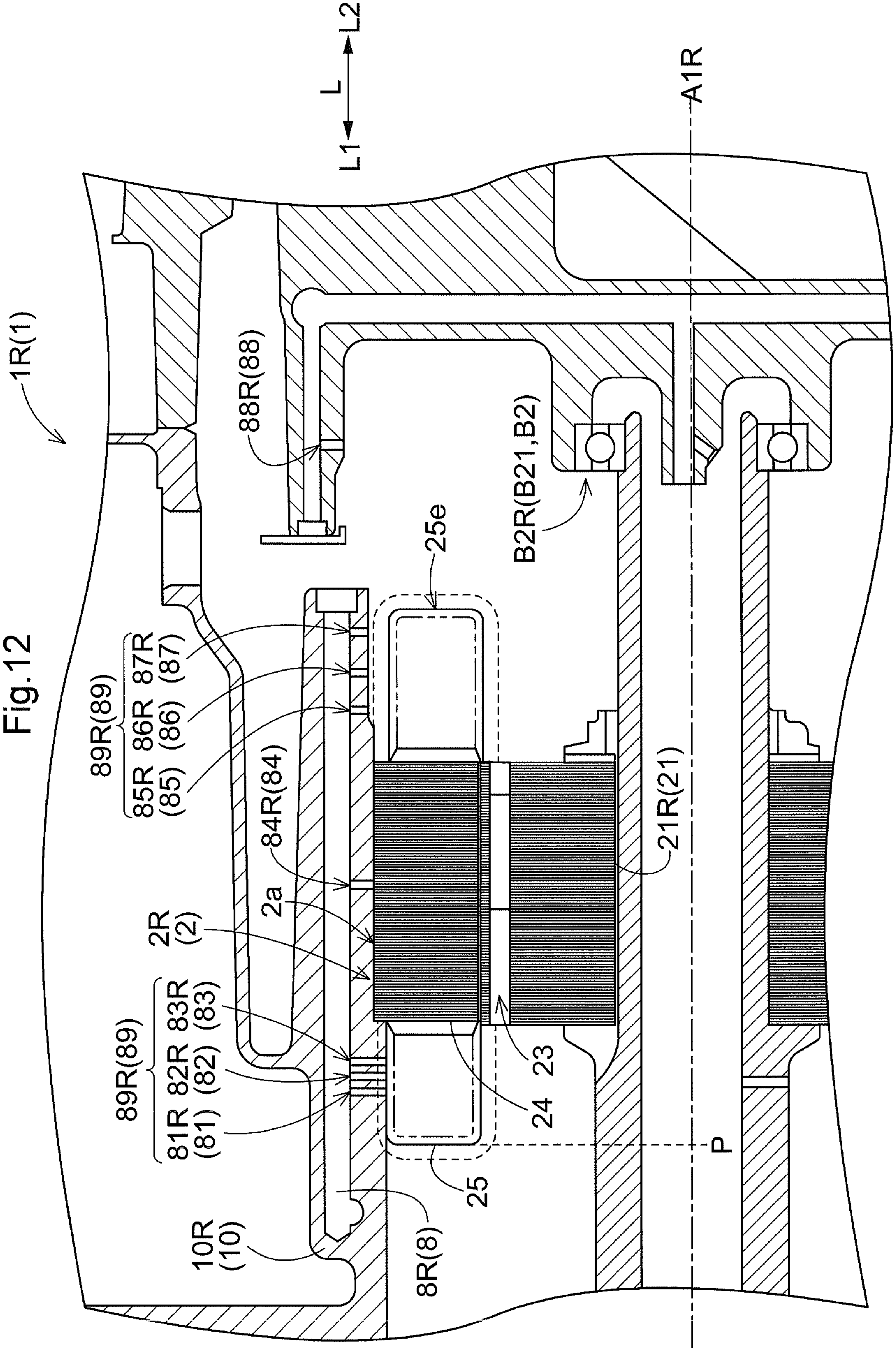
FIG. 12 is a diagram showing an example supply of oil to the second rotary electric machine through a second oil passage.

As described above, the drive unit 1 includes an oil pump (not shown), and can supply lubricant oil and cooling oil to the rotary electric machine 2, the transmission gear assembly 6, the differential gear assembly 5, and bearings for these components. The case 10 includes an oil passage through which oil from the oil pump flows. The oil passage is integral with the case 10 or defined by attaching a separate component to the case 10. As shown in FIGS. 1, 11, and 12, the drive unit 1 includes an oil passage unit 80 extending in the axial direction L and facing an outer circumferential surface 2_a_ of the rotary electric machine 2 (outer circumferential surface of the stator core 24). The oil passage unit 80 includes an oil passage 8 through which oil flows. More specifically, as shown in FIGS. 1 and 11, the front-wheel drive unit 1F includes a first oil passage unit 80F extending in the axial direction L and facing the outer circumferential surface 2_a_ of the first rotary electric machine 2F. The first oil passage unit 80F includes a first oil passage 8F through which oil flows. As shown in FIGS. 1 and 12, the rear-wheel drive unit 1R includes a second oil passage unit 80R extending in the axial direction L and facing the outer circumferential surface 2_a_ of the second rotary electric machine 2R. The second oil passage unit 80R includes a second oil passage 8R through which oil flows.

As shown in FIGS. 1, 11, and 12, the oil passage unit 80 has multiple oil supply ports 89 continuous with the oil passage 8 and open to the rotary electric machine 2. More specifically, as shown in FIGS. 1 and 11, the first oil passage unit 80F has multiple first oil supply ports 89F continuous with the first oil passage 8F and open to the first rotary electric machine 2F. As shown in FIGS. 1 and 12, the second oil passage unit 80R has multiple second oil supply ports 89R continuous with the second oil passage 8R and open to the second rotary electric machine 2R.

As described above, the first case 10F and the second case 10R may be cast with the same mold, but the first oil passage unit 80F and the second oil passage unit 80R may have the oil supply ports 89 at different positions in the oil passage unit 80. For example, for the vehicle 100 that drives in a two-wheel drive mode with the front-wheel drive unit 1F during normal driving and can drive in a four-wheel drive mode with also a driving force from the rear-wheel drive unit 1R under specific conditions such as snow-covered roads, the first rotary electric machine 2F mounted on the front-wheel drive unit 1F may have different specifications from the second rotary electric machine 2R mounted on the rear-wheel drive unit 1R. When the second rotary electric machine 2R has a lower output of the rated current than the first rotary electric machine 2F, the second rotary electric machine 2R can have a lower cost, and the vehicle 100 can have a lower cost.

In contrast, to reduce the entire cost of the vehicle 100, the front-wheel drive unit 1F and the rear-wheel drive unit 1R may have the same components as appropriate, and the arrangement of the case 10 and the axes, or the positions of the bearings may be the same. To reduce the output of the rated current of the second rotary electric machine 2R further than the first rotary electric machine 2F under such restrictions, the second rotary electric machine 2R may have a smaller dimension in the axial direction than the first rotary electric machine 2F. More specifically, fewer electromagnetic steel plates may be stacked in the axial direction to form the rotor core 22 and the stator core 24 to shorten the rotary electric machine 2 in the axial direction. In this case, the positions of coil ends 25*e* in the axial direction L of the stator coil 25 protruding from the two ends of the stator core 24 in the axial direction L differ between the first rotary electric machine 2F and the second rotary electric machine 2R.

The rotary electric machine 2 serving as a drive source for the wheels W is more likely to generate high heat with a large current flowing through the stator coil 25 and electric resistance of the stator coil 25. The stator coil 25 is wound around the stator core 24. The stator 23 has, at its ends in the axial direction L, the coil ends 25*e* as bends of the wound stator coil 25 protruding from the stator core 24 in the axial direction L. The stator coil 25 extends through the stator core 24. Thus, the stator coil 25 is often cooled with oil as a refrigerant applied to the coil ends 25*e*. Oil is supplied to the coil ends 25*e* through some of the oil supply ports 89 continuous with the oil passage 8 and open to the rotary electric machine 2.

In the present embodiment, independent of the orientations of the front-wheel drive unit 1F and the rear-wheel drive unit 1R in the vehicle width direction Y (axial direction L), a direction from the rotor output gear 31 toward the rotor 21 along the axis in the axial direction L is referred to as a first axial direction L1, and the opposite direction is referred to as a second axial direction L2. In the present embodiment, as shown in FIGS. 11 and 12, the first rotary electric machine 2F and the second rotary electric machine 2R have different dimensions in the axial direction L. Thus, the positional relationship between the multiple first oil supply ports 89F with respect to an end P of the first rotary electric machine 2F in the first axial direction L1 differs from the positional relationship between the multiple second oil supply ports 89R with respect to an end P of the second rotary electric machine 2R in the first axial direction L1.

In the present embodiment, the end P of the first rotary electric machine 2F in the first axial direction L1 is at the same position as the end P of the second rotary electric machine 2R in the first axial direction L1. Thus, the position of the coil end 25*e* in the first axial direction L1 is at the same position between the first rotary electric machine 2F and the second rotary electric machine 2R. Thus, the oil supply ports 89 (oil supply ports 89 denoted with 81, 82, and 83) through which oil is supplied to the coil end 25*e* in the first axial direction L1 are at the same positions between the first rotary electric machine 2F and the second rotary electric machine 2R. More specifically, first oil supply ports 89F denoted with 81F, 82F, and 83F through which oil is supplied to the coil end 25*e* of the first rotary electric machine 2F in the first axial direction L1 are at the same positions in the axial direction L as second oil supply ports 89R denoted with 81R, 82R, and 83R through which oil is supplied to the coil end 25*e* of the second rotary electric machine 2R in the first axial direction L1.

As shown in FIG. 11, the front-wheel drive unit 1F has first oil supply ports 89F denoted with 84F and 85F through which cooling oil is supplied to the stator core 24 in the first rotary electric machine 2F. The front-wheel drive unit 1F also has first oil supply ports 89F denoted with 86F, 87F, and 88F through which oil is supplied to the coil end 25*e* of the first rotary electric machine 2F in the second axial direction L2. In the front-wheel drive unit 1F, when viewed vertically, the coil end 25*e* in the second axial direction L2 overlaps the rotor bearing B2 (first rotor bearing B21) in the second axial direction L2. Thus, when the oil that has cooled the coil end 25*e* drops, the oil can also lubricate the rotor bearing B2.

As shown in FIG. 12, the rear-wheel drive unit 1R has a second oil supply port 89R denoted with 84R through which cooling oil is supplied to the stator core 24 in the second rotary electric machine 2R. The rear-wheel drive unit 1R has second oil supply ports 89R denoted with 85R, 86R, and 87R through which oil is supplied to the coil end 25*e* of the second rotary electric machine 2R in the second axial direction L2. The rear-wheel drive unit 1R also has a second oil supply port 89R denoted with 88R through which lubricant oil is supplied to the rotor bearing B2 (first rotor bearing B21) in the second axial direction L2. In the second rotary electric machine 2R shorter in the axial direction L than the first rotary electric machine 2F, when the arrangement position of the rotor bearing B2 is the same for forming the same structure, the coil end 25*e* in the second axial direction L2 does not overlap the rotor bearing B2 (first rotor bearing B21) in the second axial direction L2 when viewed vertically. This structure restricts oil that has cooled the coil end 25*e* dropping onto the rotor bearing B2. Thus, the second oil supply port 89R denoted with 88R may be located above (where the port faces the rotor bearing B2 in the radial direction about the input axis A1) the rotor bearing B2.

The front-wheel drive unit 1F and the rear-wheel drive unit 1R have partially or entirely the same case structure with the oil supply ports 89 at different positions in the axial direction L. The first rotary electric machine 2F and the second rotary electric machine 2R with, for example, different dimensions in the axial direction L can thus easily receive oil at an appropriate position based on the dimensions of the respective rotary electric machines 2. More specifically, the vehicle 100 according to the present embodiment including the four-wheel drive unit and having partially the same internal structure and partially the same case structure can be provided at a low cost.

The oil supply ports 89 can be formed by, for example, additionally processing the cast case 10. As described above, when the positions of the oil supply ports 89 are adjustable, the drive unit 1 can meet the intended specifications of the vehicle 100 while having the same case 10.

Other Embodiments

Other embodiments will now be described. The structures described in the embodiments below may not be implemented separately but may be combined with those in other embodiments unless any contradiction arises.

(1) In the above embodiment, the drive unit 1 has three axes including the input axis A1, the output axis A2, and the counter axis A3. In some embodiments, the drive unit 1 may have two, four, or more axes.

(2) In the above embodiment, the first case 10F and the second case 10R are cast with the same mold. In some embodiments, the first case 10F and the second case 10R may be cast with molds at least partially different from each other.

Figure 7:
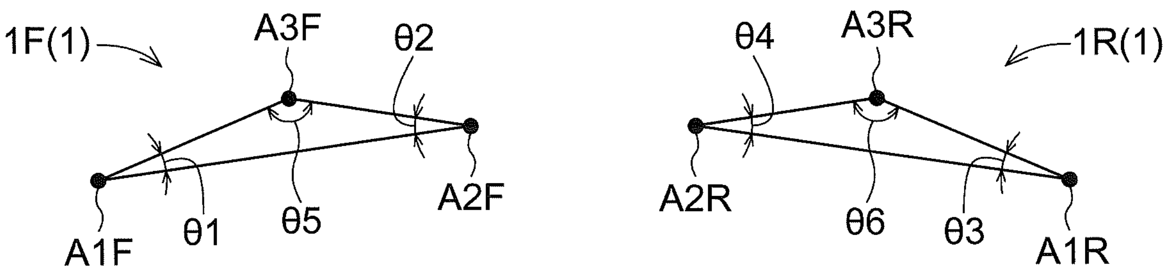
FIG. 7 is a diagram showing the arrangement of axes (the arrangement angle) between the front-wheel drive unit and the rear-wheel drive unit.

(3) In the above embodiment, the front-wheel drive unit 1F and the rear-wheel drive unit 1R have the same wheelbases between the input axis A1, the output axis A2, and the counter axis A3. In some embodiments, the front-wheel drive unit 1F and the rear-wheel drive unit 1R may have the respective counter axes A3 at different arrangement positions when having the same wheelbase between the input axis A1 and the output axis A2. In this case, as described above with reference to FIG. 7, the first included angle θ1 and the third included angle θ3 may differ from each other, the second included angle θ2 and the fourth included angle θ4 may differ from each other, and the fifth included angle θ5 and the sixth included angle θ6 may differ from each other.

(4) In the above embodiment, the front-wheel drive unit 1F and the rear-wheel drive unit 1R include the respective transmission gear assemblies 6 with the same structure, and the first transmission gear assembly 6F in the front-wheel drive unit 1F and the second transmission gear assembly 6R in the rear-wheel drive unit 1R are at positions rotational symmetry at 180 degrees about a virtual axis extending in the vertical direction Z. In some embodiments, the transmission gear assembly 6 may vary between the front-wheel drive unit 1F and the rear-wheel drive unit 1R.

(5) In the above embodiment, the first controller 9F and the second controller 9R have the same circuit structure including the circuit components having the same electric characteristics. In some embodiments, the first controller 9F and the second controller 9R may have different circuit structures including circuit components having different electric characteristics. In this case as well, the first controller 9F and the second controller 9R may be accommodated in the inverter chamber E2 with the same structure.

(6) In the above embodiment, the drive unit 1 includes the catch tank 7. In some embodiments, the drive unit 1 may eliminate the catch tank 7. For example, the components in the drive unit 1 may be cooled or lubricated with oil supplied from, for example, an oil pump.

(7) In the above embodiment, the first rotary electric machine 2F and the second rotary electric machine 2R have different lengths in the axial direction L. In some embodiments, the first rotary electric machine 2F and the second rotary electric machine 2R may have the same length in the axial direction L. In some embodiments, the first rotary electric machine 2F and the second rotary electric machine 2R having the different lengths in the axial direction L may have the oil supply ports 89 at the same position in the axial direction L.

(8) In the above embodiment, the front-wheel first angle θf1, or an angle between the horizontal plane and a plane including the front-wheel input axis A1F and the front-wheel output axis A2F, is the same as the rear-wheel first angle θr1, or an angle between the horizontal plane and a plane including the rear-wheel input axis A1R and the rear-wheel output axis A2R. In some embodiments, the front-wheel first angle θf1 and the rear-wheel first angle θr1 may differ from each other. For example, the front-wheel drive unit 1F and the rear-wheel drive unit 1R may be mounted at different angles with respect to the horizontal plane (horizontal plane of the vehicle body). In this case, the front-wheel first angle θf1 and the rear-wheel first angle θr1 differ from each other.

(9) In the above embodiment, the front-wheel second angle θf2, or an angle between the horizontal plane and a plane including the front-wheel input axis A1F and the front-wheel counter axis A3F, is the same as the rear-wheel second angle θr2, or an angle between the horizontal plane and a plane including the rear-wheel input axis A1R and the rear-wheel counter axis A3R. In some embodiments, the front-wheel second angle θf2 and the rear-wheel second angle θr2 may differ from each other.

Overview of Embodiments

The vehicle (100) described above will be overviewed briefly below.

In one aspect, a vehicle (100) includes a front-wheel drive unit (1F) that drives a pair of front wheels (WF) and a rear-wheel drive unit (1R) that drives a pair of rear wheels (WR). The front-wheel drive unit (1F) includes a first rotary electric machine (2F) including a first rotor (21F), a first differential gear assembly (5F) that distributes a driving force transmitted to a first differential input gear (51F) to the pair of front wheels (WF), a first transmission gear assembly (6F) that transmits the driving force between the first rotor (21F) and the first differential input gear (51F), and a first case (10F) defining a first chamber (E1F) accommodating the first rotary electric machine (2F), the first differential gear assembly (5F), and the first transmission gear assembly (6F). The first rotor (21F) is located on a first axis (A1F). The first differential input gear (51F) is located on a second axis (A2F) parallel to and different from the first axis (A1F). The rear-wheel drive unit (1R) includes a second rotary electric machine (2R) including a second rotor (21R), a second differential gear assembly (5R) that distributes a driving force transmitted to a second differential input gear (51R) to the pair of rear wheels (WR), a second transmission gear assembly (6R) that transmits the driving force between the second rotor (21R) and the second differential input gear (51R), and a second case (10R) defining a second chamber (E1R) accommodating the second rotary electric machine (2R), the second differential gear assembly (5R), and the second transmission gear assembly (6R). The second rotor (21R) is located on a third axis (A1R). The second differential input gear (51R) is located on a fourth axis (A2R) parallel to and different from the third axis (A1R). The front-wheel drive unit (1F) has the first axis (A1F) in a front direction (XF) from the second axis (A2F) and the first rotor (21F) in a first width direction (Y1) from the first transmission gear assembly (6F). The rear-wheel drive unit (1R) has the third axis (AR) in a rear direction (XR) from the fourth axis (A2R) and the second rotor (21R) in a second width direction (Y2) from the second transmission gear assembly (6R). The front direction (XF) is a direction from the pair of rear wheels (WR) toward the pair of front wheels (WF) along an axis in a front-rear direction (X) of the vehicle. The rear direction (XR) is opposite to the front direction (XF). The first width direction (Y1) is one direction along an axis in a width direction (Y) of the vehicle. The second width direction (Y2) is opposite to the first width direction (Y1). A wheelbase (D12F) between the first axis (A1F) and the second axis (A2F) is equal to a wheelbase (D12R) between the third axis (A1R) and the fourth axis (A2R). A rotation direction of the first rotor (21F) when viewed from the first transmission gear assembly (6F) is reverse to a rotation direction of the second rotor (21R) when viewed from the second transmission gear assembly (6R) while the vehicle (100) is traveling.

The vehicle (100) with this structure includes the front-wheel drive unit (1F) and the rear-wheel drive unit (1R) each including the rotary electric machine (2) serving as a drive power source for the four-wheel drive unit (1). These drive units (1) have, in their respective cases (10), the same positional relationship between the axis (A1) on which the rotary electric machine (2) is located and the axis (A2) on which the differential gear assembly (5) is located. Thus, the front-wheel drive unit (1F) and the rear-wheel drive unit (1R) can easily have partially or entirely the same internal structure and partially or entirely the same case structure. The four-wheel drive unit (1) with this structure can include fewer components and have a lower cost. In addition, in the front-wheel drive unit (1F), the first rotary electric machine (2F) is in the front direction (XF) from the second axis (A2F), or an axle to which the front wheels (WF) are coupled. In the rear-wheel drive unit (1R), the second rotary electric machine (2R) is in the rear direction (XR) from the fourth axis (A2R), or an axle to which the rear wheels (WR) are coupled. Thus, a space can be easily left between the axle for the front wheels (WF) and the axle for the rear wheels (WR). This space can easily receive a component, such as an electric storage device (BH), and is usable for a cabin. As in the front-wheel drive unit (1F), when, for example, the second rotary electric machine (2R) is in the front direction (XF) from the fourth axis (A2R), the rear seat may have an insufficient legroom. However, the vehicle (100) with this structure can easily have a sufficient legroom in the rear seat for passenger comfort. More specifically, the vehicle (100) with this structure including the four-wheel drive unit (1) can be provided at a low cost.

In the vehicle (100), the first transmission gear assembly (6F) may include a first counter gear assembly (4F) located on a fifth axis (A3F) parallel to and different from the first axis (A1F) and the second axis (A2F). The second transmission gear assembly (6R) may include a second counter gear assembly (4R) located on a sixth axis (A3R) parallel to and different from the third axis (A1R) and the fourth axis (A2R). Wheelbases (D12F, D13F, D23F) between the first and second axes (A1F, A2F), between the first and fifth axes (A1F, A3F), and between the second and fifth axes (A2F, A3F) may be equal to wheelbases (D12F, D13F, D23F) between the third and fourth axes (A1R, A2R), between the third and sixth axes (A1R, A3R), and between the fourth and sixth axes (A2R, A3R).

In this structure, the front-wheel drive unit (1F) and the rear-wheel drive unit (1R) have the same positional structure between the two axes, or the axis (A1, A1F, or A1R) on which the rotary electric machine (2, 2F, or 2R) is located and the axis (A2, A2F or A2R) on which the differential gear assembly (5, 5F, or 5R) is located, as well as the same positional relationship between each of the two axes and the axis (A3, A3F, or A3R) in the counter gear assembly (4, 4F, or 4R). Thus, the front-wheel drive unit (1F) and the rear-wheel drive unit (1R) can easily have partially or entirely the same internal structure and partially or entirely the same case structure.

In the vehicle (100), an angle (θ1) between a plane including the first axis (A1F) and the second axis (A2F) and a plane including the first axis (A1F) and the fifth axis (A3F) may be equal to an angle (θ3) between a plane including the third axis (A1R) and the fourth axis (A2R) and a plane including the third axis (A1R) and the sixth axis (A3R). An angle (θ2) between a plane including the second axis (A2F) and the first axis (A1F) and a plane including the second axis (A2F) and the fifth axis (A3F) may be equal to an angle (θ4) between a plane including the fourth axis (A2R) and the third axis (A1R) and a plane including the fourth axis (A2R) and the sixth axis (A3R). An angle (θ5) between a plane including the fifth axis (A3F) and the first axis (A1F) and a plane including the fifth axis (A3F) and the second axis (A2F) may be equal to an angle (θ6) between a plane including the sixth axis (A3R) and the third axis (A1R) and a plane including the sixth axis (A3R) and the fourth axis (A2R).

In this structure, the front-wheel drive unit (1F) and the rear-wheel drive unit (1R) have the same positional relationship between the rotary electric machine (2), the differential gear assembly (5), and the counter gear assembly (4), and can thus easily have the same internal structure.

In the vehicle (100), the first transmission gear assembly (6F) may include a first rotor output gear (31F) and the first counter gear assembly (4F). The first rotor output gear (31F) may be rotatable integrally with the first rotor (21F). The first counter gear assembly (4F) may include a first gear (41F) and a second gear (42F). The second gear (42F) may be rotatable integrally with the first gear (41F). The first gear (41F) and the first rotor output gear (31F) may mesh with each other. The second gear (42F) and the first differential input gear (51F) may mesh with each other. The second transmission gear assembly (6R) may include a second rotor output gear (31R) and the second counter gear assembly (4R). The second rotor output gear (31R) may be rotatable integrally with second rotor (21R). The second counter gear assembly (4R) may include a third gear (41R) and a fourth gear (42R). The fourth gear (42R) may be rotatable integrally with the third gear (41R). The third gear (41R) and the second rotor output gear (31R) may mesh with each other. The fourth gear (42R) and the second differential input gear (51R) may mesh with each other. A position of the second gear (42F) relative to the first gear (41F) may be reverse to a position of the fourth gear (42R) relative to the third gear (41R) in the width direction (Y) of the vehicle.

In this structure, the first transmission gear assembly (6F) and the second transmission gear assembly (6R) have the same structure, and thus the front-wheel drive unit (1F) and the rear-wheel drive unit (1R) can easily have the same internal structure.

The vehicle (100) may further include a first controller (9F) that drives and controls the first rotary electric machine (2F) and a second controller (9R) that drives and controls the second rotary electric machine (2R). The first controller (9F) and the second controller (9R) may have a same circuit structure including circuit components with same electric characteristics. The first case (10F) may include a third chamber (E2F) accommodating the first controller (9F). The second case (10R) may include a fourth chamber (E2R) accommodating the second controller (9R).

In this structure, the first controller (9F) and the second controller (9R) have the same circuit structure including the circuit components with the same electric characteristics. The front-wheel drive unit (1F) and the rear-wheel drive unit (1R) can thus easily have the same case structure.

In the vehicle (100), the front-wheel drive unit (1F) may include a first catch tank (7F) that stores oil splashed through rotation of the first differential input gear (51F) and gears included in the first transmission gear assembly (6F). The rear-wheel drive unit (1R) may include a second catch tank (7R) that stores oil splashed through rotation of the second differential input gear (51R) and gears included in the second transmission gear assembly (6R). The first catch tank (7F) may store oil splashed by at least the first differential input gear (51F) or the gears included in the first transmission gear assembly (6F) when the pair of front wheels (WF) are in a forward rotation state and in a reverse rotation state. The second catch tank (7R) may store oil splashed by at least the second differential input gear (51R) or the gears included in the second transmission gear assembly (6R) when the pair of rear wheels (WR) are in the forward rotation state and in the reverse rotation state. The forward rotation state may be a state in which the pair of front wheels (WF) and the pair of rear wheels (WR) are rotating to move the vehicle (100) forward. The reverse rotation state may be a state in which the pair of front wheels (WF) and the pair of rear wheels (WR) are rotating to move the vehicle (100) backward.

In this structure, the catch tank (7, 7F, or 7R) can store oil as appropriate independent of when the front-wheel drive unit (1F) and the rear-wheel drive unit (1R) are located in the opposite directions from each other in the vehicle front-rear direction (X). This structure can thus supply oil to target portions as appropriate through the catch tank (7, 7F, or 7R). Thus, the front-wheel drive unit (1F) and the rear-wheel drive unit (1R) can easily have the same structure.

In the vehicle (100), the front-wheel drive unit (1F) may include a first oil passage unit (80F) extending in an axial direction (L) and facing an outer circumferential surface of the first rotary electric machine (2F). The first oil passage unit (80F) may include a first oil passage (8F) through which oil flows. The first oil passage unit (80F) may have a plurality of first oil supply ports (89F) continuous with the first oil passage (8F) and open to the first rotary electric machine (2F). The rear-wheel drive unit (1R) may include a second oil passage unit (80R) extending in the axial direction (L) and facing an outer circumferential surface of the second rotary electric machine (2R). The second oil passage unit (80R) may include a second oil passage (8R) through which oil flows. The second oil passage unit (80R) may have a plurality of second oil supply ports (89R) continuous with the second oil passage (8R) and open to the second rotary electric machine (2R). The first rotary electric machine (2F) and the second rotary electric machine (2R) may have different dimensions in the axial direction (L). A positional relationship between the plurality of first oil supply ports (89F) with reference to an end of the first rotary electric machine (2F) in a first axial direction (L1) may differ from a positional relationship between the plurality of second oil supply ports (89R) with reference to an end of the second rotary electric machine (2R) in the first axial direction (L1). The axial direction (L) may be a direction parallel to the first axis (A1F) in the front-wheel drive unit (1F) and a direction parallel to the third axis (A1R) in the rear-wheel drive unit (1R). The first axial direction (L1) may be one direction along an axis in the axial direction (L). A second axial direction (L2) may be opposite to the first axial direction (L1).

In this structure, the front-wheel drive unit (1F) and the rear-wheel drive unit (1R) have partially or entirely the same case structure with the oil supply ports (89, 89F, or 89R) at different positions in the axial direction (L). The first rotary electric machine (2F) and the second rotary electric machine (2R) with, for example, different dimensions in the axial direction (L) can thus easily receive oil at appropriate position based on the dimensions of the rotary electric machines (2, 2F, or 2R). More specifically, the vehicle (100) with this structure including the four-wheel drive unit (1, 1F, or 1R) and having partially the same internal structure and partially the same case structure can be provided at a low cost.

In the vehicle (100), an angle (θf2) between a horizontal plane and a plane including the first axis (A1F) and the fifth axis (A3F) may be equal to an angle (θr2) between the horizontal plane and a plane including the third axis (A1R) and the sixth axis (A3R).

In this structure, the front-wheel drive unit (1F) and the rear-wheel drive unit (1R) have the same positional relationship between the rotary electric machine (2, 2F, or 2R) and the counter gear assembly (4, 4F, and 4R). The front-wheel drive unit (1F) and the rear-wheel drive unit (1R) can thus easily have the same internal structure.

In the vehicle (100), an angle (θf1) between a horizontal plane and a plane including the first axis (A1F) and the second axis (A2F) may be equal to an angle (θr1) between the horizontal plane and a plane including the third axis (A1R) and the fourth axis (A2R).

In this structure, the front-wheel drive unit (1F) and the rear-wheel drive unit (1R) have the same positional relationship between the rotary electric machine (2, 2F, or 2R) and the differential gear assembly (5, 5F, and 5R) and can thus easily have the same internal structure.

In the vehicle (100), the first case (10F) and the second case (10R) may be cases cast with a mold.

Casting the first case (10F) and the second case (10R) with the same mold allows the front-wheel drive unit (1F) and the rear-wheel drive (1R) to easily have partially or entirely the same internal structure and partially or entirely the same case structure.

REFERENCE SIGNS LIST

1F: front-wheel drive unit, 1R: rear-wheel drive unit, 2F: first rotary electric machine, 2R: second rotary electric machine, 2*a*: outer circumferential surface, 4F: first counter gear assembly, 4R: second counter gear assembly, 5F: first differential gear assembly, 5R: second differential gear assembly, 6F: first transmission gear assembly, 6R: second transmission gear assembly, 7F: first catch tank, 7R: second catch tank, 8F: first oil passage, 8R: second oil passage, 9F: first controller, 9R: second controller, 10F: first case, 10R: second case, 21F: first rotor, 21R: second rotor, 31F: first rotor output gear, 31R: second rotor output gear, 41F: front-wheel first counter gear (first gear), 41R: rear-wheel first counter gear (second gear), 42F: front-wheel second counter gear (third gear), 42R: rear-wheel second counter gear (fourth gear), 51: differential input gear, 51F: first differential input gear, 51R: second differential input gear, 80F: first oil passage unit, 80R: second oil passage unit, 89F: first oil supply port, 89R: second oil supply port, 100: vehicle, A1F: front-wheel input axis (first axis), A1R: rear-wheel input axis (third axis), A2F: front-wheel output axis (second axis), A2R: rear-wheel output axis (fourth axis), A3F: front-wheel counter axis (fifth axis), A3R: rear-wheel counter axis (sixth axis), D12F: front-wheel first wheelbase (wheelbase between first and second axes), D12R: rear-wheel first wheelbase (wheelbase between third and fourth axes), D13F: front-wheel third wheelbase (wheelbase between first and fifth axes), D13R: rear-wheel third wheelbase (wheelbase between third and sixth axes), D23F: front-wheel second wheelbase (wheelbase between second and fifth axes), D23R: rear-wheel second wheelbase (wheelbase between fourth and sixth axes), E1F: first chamber, E1R: second chamber, E2F: third chamber, E2R: fourth chamber, L: axial direction, L1: first axial direction, L2: second axial direction, P: end (end of first rotary electric machine in first axial direction, end of second rotary electric machine in first axial direction), WF: front wheel, WR: rear wheel, X:

vehicle front-rear direction, XF: front direction, XR: rear direction, Y: vehicle width direction, Y1: first width direction, Y2: second width direction, Z: vertical direction, θ1: first included angle (angle between plane including first and second axes and plane including first and fifth axes), θ2: second included angle (angle between plane including second and first axes and plane including second and fifth axes), θ3: third included angle (angle between plane including third and fourth axes and plane including third and sixth axes), θ4: fourth included angle (angle between plane including fourth and third axes and plane including fourth and sixth axes), θ5: fifth included angle (angle between plane including fifth and first axes and plane including fifth and second axes), θ6: sixth included angle (angle between plane including sixth and third axes and plane including sixth and fourth axes), θf1: front-wheel first angle (angle between horizontal plane and plane including first and second axes), θf2: front-wheel second angle (angle between horizontal plane and plane including first and fifth axes), θr1: rear-wheel first angle (angle between horizontal plane and plane including third and fourth axes), θr2: rear-wheel second angle (an angle between horizontal plane and plane including third and sixth axes)

The invention claimed is:

1. A vehicle, comprising:

a front-wheel drive unit configured to drive a pair of front wheels; and a rear-wheel drive unit configured to drive a pair of rear wheels, wherein the front-wheel drive unit includes a first rotary electric machine including a first rotor, a first differential gear assembly configured to distribute a driving force transmitted to a first differential input gear to the pair of front wheels, a first transmission gear assembly configured to transmit the driving force between the first rotor and the first differential input gear, and a first case defining a first chamber accommodating the first rotary electric machine, the first differential gear assembly, and the first transmission gear assembly, the first rotor is located on a first axis, and the first differential input gear is located on a second axis parallel to and different from the first axis, the rear-wheel drive unit includes a second rotary electric machine including a second rotor, a second differential gear assembly configured to distribute a driving force transmitted to a second differential input gear to the pair of rear wheels, a second transmission gear assembly configured to transmit the driving force between the second rotor and the second differential input gear, and a second case defining a second chamber accommodating the second rotary electric machine, the second differential gear assembly, and the second transmission gear assembly, the second rotor is located on a third axis, and the second differential input gear is located on a fourth axis parallel to and different from the third axis, the front-wheel drive unit has the first axis in a front direction from the second axis and the first rotor in a first width direction from the first transmission gear assembly, and the rear-wheel drive unit has the third axis in a rear direction from the fourth axis and the second rotor in a second width direction from the second transmission gear assembly, where the front direction is a direction from the pair of rear wheels toward the pair of front wheels along an axis in a front-rear direction, the rear direction is opposite to the front direction, the first width direction is one direction along an axis in a width direction of the vehicle, and the second width direction is opposite to the first width direction, a wheelbase between the first axis and the second axis is equal to a wheelbase between the third axis and the fourth axis, a rotation direction of the first rotor when viewed from the first transmission gear assembly is reverse to a rotation direction of the second rotor when viewed from the second transmission gear assembly while the vehicle is traveling, the front-wheel drive unit includes a first catch tank configured to store oil splashed through rotation of the first differential input gear and gears included in the first transmission gear assembly, the rear-wheel drive unit includes a second catch tank configured to store oil splashed through rotation of the second differential input gear and gears included in the second transmission gear assembly, the first catch tank stores oil splashed by at least the first differential input gear or the gears included in the first transmission gear assembly when the pair of front wheels are in a forward rotation state and in a reverse rotation state, and the second catch tank stores oil splashed by at least the second differential input gear or the gears included in the second transmission gear assembly when the pair of rear wheels are in the forward rotation state and in the reverse rotation state, where the forward rotation state is a state in which the pair of front wheels and the pair of rear wheels are rotating to move the vehicle forward, and the reverse rotation state is a state in which the pair of front wheels and the pair of rear wheels are rotating to move the vehicle backward.

2. The vehicle according to claim 1, wherein the first transmission gear assembly includes a first counter gear assembly located on a fifth axis parallel to and different from the first axis and the second axis, the second transmission gear assembly includes a second counter gear assembly located on a sixth axis parallel to and different from the third axis and the fourth axis, and wheelbases between the first and second axes, between the first and fifth axes, and between the second and fifth axes are equal to wheelbases between the third and fourth axes, between the third and sixth axes, and between the fourth and sixth axes.

3. The vehicle according to claim 2, wherein an angle between a plane including the first axis and the second axis and a plane including the first axis and the fifth axis is equal to an angle between a plane including the third axis and the fourth axis and a plane including the third axis and the sixth axis, an angle between a plane including the second axis and the first axis and a plane including the second axis and the fifth axis is equal to an angle between a plane including the fourth axis and the third axis and a plane including the fourth axis and the sixth axis, and an angle between a plane including the fifth axis and the first axis and a plane including the fifth axis and the second axis is equal to an angle between a plane including the sixth axis and the third axis and a plane including the sixth axis and the fourth axis.

4. The vehicle according to claim 2, wherein the first transmission gear assembly includes a first rotor output gear and the first counter gear assembly, and the first rotor output gear is rotatable integrally with the first rotor, the first counter gear assembly includes a first gear and a second gear, and the second gear is rotatable integrally with the first gear, the first gear and the first rotor output gear mesh with each other, and the second gear and the first differential input gear mesh with each other, the second transmission gear assembly includes a second rotor output gear and the second counter gear assembly, and the second rotor output gear is rotatable integrally with the second rotor, the second counter gear assembly includes a third gear and a fourth gear, and the fourth gear is rotatable integrally with the third gear, the third gear and the second rotor output gear mesh with each other, and the fourth gear and the second differential input gear mesh with each other, and a position of the second gear relative to the first gear is reverse to a position of the fourth gear relative to the third gear in the width direction of vehicle.

5. The vehicle according to claim 2, wherein an angle between a horizontal plane and a plane including the first axis and the fifth axis is equal to an angle between the horizontal plane and a plane including the third axis and the sixth axis.

6. The vehicle according to claim 1, further comprising:

a first controller configured to drive and control the first rotary electric machine; and a second controller configured to drive and control the second rotary electric machine, wherein the first controller and the second controller have a same circuit structure including circuit components with same electric characteristics, the first case includes a third chamber accommodating the first controller, and the second case includes a fourth chamber accommodating the second controller.

7. The vehicle according to claim 1, wherein an angle between a horizontal plane and a plane including the first axis and the second axis is equal to an angle between the horizontal plane and a plane including the third axis and the fourth axis.

8. The vehicle according to claim 1, wherein the first case and the second case are cases cast with a mold.

9. A vehicle, comprising:

a front-wheel drive unit configured to drive a pair of front wheels; and a rear-wheel drive unit configured to drive a pair of rear wheels, wherein the front-wheel drive unit includes a first rotary electric machine including a first rotor, a first differential gear assembly configured to distribute a driving force transmitted to a first differential input gear to the pair of front wheels, a first transmission gear assembly configured to transmit the driving force between the first rotor and the first differential input gear, and a first case defining a first chamber accommodating the first rotary electric machine, the first differential gear assembly, and the first transmission gear assembly, the first rotor is located on a first axis, and the first differential input gear is located on a second axis parallel to and different from the first axis, the rear-wheel drive unit includes a second rotary electric machine including a second rotor, a second differential gear assembly configured to distribute a driving force transmitted to a second differential input gear to the pair of rear wheels, a second transmission gear assembly configured to transmit the driving force between the second rotor and the second differential input gear, and a second case defining a second chamber accommodating the second rotary electric machine, the second differential gear assembly, and the second transmission gear assembly, the second rotor is located on a third axis, and the second differential input gear is located on a fourth axis parallel to and different from the third axis, the front-wheel drive unit has the first axis in a front direction from the second axis and the first rotor in a first width direction from the first transmission gear assembly, and the rear-wheel drive unit has the third axis in a rear direction from the fourth axis and the second rotor in a second width direction from the second transmission gear assembly, where the front direction is a direction from the pair of rear wheels toward the pair of front wheels along an axis in a front-rear direction, the rear direction is opposite to the front direction, the first width direction is one direction along an axis in a width direction of the vehicle, and the second width direction is opposite to the first width direction, a wheelbase between the first axis and the second axis is equal to a wheelbase between the third axis and the fourth axis, a rotation direction of the first rotor when viewed from the first transmission gear assembly is reverse to a rotation direction of the second rotor when viewed from the second transmission gear assembly while the vehicle is traveling, the front-wheel drive unit includes a first oil passage unit extending an axial direction and facing an outer circumferential surface of the first rotary electric machine, and the first oil passage unit includes a first oil passage through which oil flows, the first oil passage unit has a plurality of first oil supply ports continuous with the first oil passage and open to the first rotary electric machine, the rear-wheel drive unit includes a second oil passage unit extending in the axial direction and facing an outer circumferential surface of the second rotary electric machine, and the second oil passage unit includes a second oil passage through which oil flows, the second oil passage unit has a plurality of second oil supply ports continuous with the second oil passage and open to the second rotary electric machine, the first rotary electric machine and the second rotary electric machine have different dimensions in the axial direction, and a positional relationship between the plurality of first oil supply ports with reference to an end of the first rotary electric machine in a first axial direction differs from a positional relationship between the plurality of second oil supply ports with reference to an end of the second rotary electric machine in the first axial direction, where the axial direction is a direction parallel to the first axis in the front-wheel drive unit and a direction parallel to the third axis in the rear-wheel drive unit, the first axial direction is one direction along an axis in the axial direction, and a second axial direction is opposite to the first axial direction.

10. The vehicle according to claim 9, wherein the first transmission gear assembly includes a first counter gear assembly located on a fifth axis parallel to and different from the first axis and the second axis, the second transmission gear assembly includes a second counter gear assembly located on a sixth axis parallel to and different from the third axis and the fourth axis, and wheelbases between the first and second axes, between the first and fifth axes, and between the second and fifth axes are equal to wheelbases between the third and fourth axes, between the third and sixth axes, and between the fourth and sixth axes.

11. The vehicle according to claim 10, wherein an angle between a plane including the first axis and the second axis and a plane including the first axis and the fifth axis is equal to an angle between a plane including the third axis and the fourth axis and a plane including the third axis and the sixth axis, an angle between a plane including the second axis and the first axis and a plane including the second axis and the fifth axis is equal to an angle between a plane including the fourth axis and the third axis and a plane including the fourth axis and the sixth axis, and an angle between a plane including the fifth axis and the first axis and a plane including the fifth axis and the second axis is equal to an angle between a plane including the sixth axis and the third axis and a plane including the sixth axis and the fourth axis.

12. The vehicle according to claim 10, wherein the first transmission gear assembly includes a first rotor output gear and the first counter gear assembly, and the first rotor output gear is rotatable integrally with the first rotor, the first counter gear assembly includes a first gear and a second gear, and the second gear is rotatable integrally with the first gear, the first gear and the first rotor output gear mesh with each other, and the second gear and the first differential input gear mesh with each other, the second transmission gear assembly includes a second rotor output gear and the second counter gear assembly, and the second rotor output gear is rotatable integrally with the second rotor, the second counter gear assembly includes a third gear and a fourth gear, and the fourth gear is rotatable integrally with the third gear, the third gear and the second rotor output gear mesh with each other, and the fourth gear and the second differential input gear mesh with each other, and a position of the second gear relative to the first gear is reverse to a position of the fourth gear relative to the third gear in the width direction of vehicle.

13. The vehicle according to claim 10, wherein an angle between a horizontal plane and a plane including the first axis and the fifth axis is equal to an angle between the horizontal plane and a plane including the third axis and the sixth axis.

14. The vehicle according to claim 9, further comprising:

a first controller configured to drive and control the first rotary electric machine; and a second controller configured to drive and control the second rotary electric machine, wherein the first controller and the second controller have a same circuit structure including circuit components with same electric characteristics, the first case includes a third chamber accommodating the first controller, and the second case includes a fourth chamber accommodating the second controller.

15. The vehicle according to claim 9, wherein an angle between a horizontal plane and a plane including the first axis and the second axis is equal to an angle between the horizontal plane and a plane including the third axis and the fourth axis.

16. The vehicle according to claim 9, wherein the first case and the second case are cases cast with a mold.

* * * * *